United States Patent [19]
Slik et al.

[11] Patent Number: 5,809,145
[45] Date of Patent: Sep. 15, 1998

[54] SYSTEM FOR DISTRIBUTING DIGITAL INFORMATION

[75] Inventors: David Slik, Brackendale; Shannon Byrne, Whistler, both of Canada

[73] Assignee: Paradata Systems Inc., Canada

[21] Appl. No.: 670,846

[22] Filed: Jun. 28, 1996

[51] Int. Cl.⁶ .................................................. H04K 1/00
[52] U.S. Cl. .......................................... 380/25; 395/650
[58] Field of Search ................... 380/4, 23, 25, 380/49, 21; 395/650, 239

[56] References Cited

U.S. PATENT DOCUMENTS

| | | | |
|---|---|---|---|
| 4,713,753 | 12/1987 | Boebert et al. | 364/200 |
| 4,736,423 | 4/1988 | Matyas | 380/23 |
| 4,888,798 | 12/1989 | Earnest | 380/4 |
| 4,897,874 | 1/1990 | Lidinsky et al. | 380/25 |
| 4,926,476 | 5/1990 | Cavey | 380/4 |
| 5,010,571 | 4/1991 | Katznelson | 380/4 |
| 5,058,162 | 10/1991 | Santon et al. | 380/25 |
| 5,218,638 | 6/1993 | Matsumoto et al. | 380/23 |
| 5,247,575 | 9/1993 | Sprague et al. | 380/9 |
| 5,297,206 | 3/1994 | Orton | 380/30 |
| 5,319,705 | 6/1994 | Halter et al. | 380/4 |
| 5,337,357 | 8/1994 | Chou et al. | 380/4 |
| 5,369,702 | 11/1994 | Shanton | 380/4 |
| 5,386,369 | 1/1995 | Christiano | 364/464 |
| 5,400,403 | 3/1995 | Fahn et al. | 380/21 |
| 5,410,598 | 4/1995 | Shear | 380/4 |
| 5,414,772 | 5/1995 | Naccache et al. | 380/46 |
| 5,457,746 | 10/1995 | Dolphin | 380/4 |
| 5,499,295 | 3/1996 | Cooper | 380/23 |
| 5,504,814 | 4/1996 | Miyahara | 380/4 |
| 5,509,070 | 4/1996 | Schull | 380/4 |
| 5,511,122 | 4/1996 | Atkinson | 380/25 |
| 5,557,796 | 9/1996 | Fehskens et al. | 395/650 |
| 5,615,264 | 3/1997 | Kazmierczak et al. | 380/4 |
| 5,634,012 | 5/1997 | Stefik et al. | 395/239 |

*Primary Examiner*—David C. Cain
*Attorney, Agent, or Firm*—Roylance, Abrams, Berdo & Goodman, L.L.P.

[57] ABSTRACT

A system for distributing digital data among a plurality of customers is provided which comprises a modular software architecture to accommodate different data preview, search, data compression and encryption functions, and different purchase transactions. A software kernel creates an operating environment in conjunction with the host operating system of a customer computer to accommodate these different services and functions and allow for the storage and retrieval of datasets from a variety of storage locations, such as portable storage devices at customer computers and shared memory devices accessible via communication networks. Computer-dependent product codes for requesting datasets and release codes for decrypting datasets are generated to protect against unauthorized use of selected datasets.

34 Claims, 27 Drawing Sheets

*FIG. 13*

| | | |
|---|---|---|
| MIRR 'Startup Module' ID = 12975 from Module.rs | | |
| Module ID | 12345 | —130 |
| Storage Type | S15 | —132 |
| Events Accepted Mask | S80 | —134 |
| Module Version | S1A | —136 |
| Kernel Version Required | S1A | —138 |
| Module Checksum | 0 | —140 |
| Module Signature | 0 | —142 |
| Module Type | STAR | —144 |
| Module Data Type | NULL | —146 |
| Module Creator | PARA | —148 |
| Uses Local Resources | ○ 0   ⊙ 1 | —150 |
| Has User Interface | ⊙ 0   ○ 1 | —152 |
| Can Be Threaded | ○ 0   ⊙ 1 | —154 |
| Is Application Code | ⊙ 0   ○ 1 | —156 |
| Is Stream Module | ⊙ 0   ○ 1 | —158 |
| DMS Compliant | ⊙ 0   ○ 1 | —160 |
| Reserved Flag 1 | ⊙ 0   ○ 1 | —162 |
| Reserved Flag 2 | ⊙ 0   ○ 1 | —164 |
| Reserved 1 | 0 | —166 |
| Reserved 2 | 0 | —168 |

—128

| ID (SORT KEY) (64 BITS) | TYPE (2 BITS) | NAME (4080 BITS) | ATTRIBUTES (128 BITS) | DATA (VARIABLE) |
|---|---|---|---|---|
| 0 | ROOT | SAMPLE DATASET | ATTRIBUTE TABLE | ROOT IDENTIFIER |
| 0:1 | SEGMENT | PERMISSIONS TABLE | ATTRIBUTE TABLE | PERMISSION TABLE |
| 0:2 | SEGMENT | SAMPLE IMAGE | ATTRIBUTE TABLE | IMAGE DATA |
| 1 | GROUP | TEST | ATTRIBUTE TABLE | PARENT ID (0) |
| 1:1 | SEGMENT | PERMISSIONS TABLE | ATTRIBUTE TABLE | PERMISSION TABLE |
| 2 | ITEM | SAMPLE ITEM | ATTRIBUTE TABLE | PARENT ID (1) |
| 2:1 | SEGMENT | PERMISSIONS TABLE | ATTRIBUTE TABLE | PERMISSION TABLE |
| 2:2 | SEGMENT | PURCHASABLE ITEM | ATTRIBUTE TABLE | EXECUTABLE FILE |

FIG. 21

SYSTEM FOR DISTRIBUTING DIGITAL INFORMATION

FIELD OF THE INVENTION

The invention relates to a system for distributing digital data and an authorization method preventing access to secured datasets by anyone other than an authorized end-user.

BACKGROUND OF THE INVENTION

The demand for methods of economically distributing digital data among a plurality of consumers is increasing, along with the demand for software publishing and distribution and the transmission of large datasets such as digital, aeronautical and satellite images. Retail software is typically sold in shrink-wrapped boxes containing manuals and a number of magnetic or optical diskettes for installing the software on a computer. Frequently, only one software title or a small group of related software is sold in each box. This method of distributing software is problematic because of limited shelf space available in retail stores. Further, while retailers attempt to maximize revenue from the sale of software displayed on limited shelf space, they are frequently required to discount retail prices in order to prosper in a competitive software retail market. Consequently, profit margins for software sales can be relatively small, although the computer software industry is growing. In a consumer market where large software publishers are earning marginal profit for distributed software programs, many small software publishers (i.e., publishers which market only a single or a few software program titles that are focused on a narrow market segment or have limited mass appeal) are not competitive for retailer shelf space. A need exists for an improved distribution system which accommodates both large and small software publishers.

The advent of compact disc read-only memory (CD-ROM) technology, which has comparatively large storage potential, permits many software program titles to be contained on one compact disc (CD). Thus, the number of unique products and the packaging for distributing software titles is reduced. Further, the distribution of titles on CD-ROM technology allows users to preview software before purchasing it, an advantage not realized by shrink-wrapped box packaging. In the past, consumers were limited to the graphics and text information on the shrink-wrapped box when deciding on whether or not to purchase software. CD-ROM technology allows information providers to provide preview datasets or limited-use datasets on the CD-ROM, as well as the individual software titles and the actual software for sale.

In addition to CD-ROM technology, the Internet offers a economical opportunity for both large and small software publishers to distribute software to end users. The Internet is a worldwide network of computer terminals that communicate with each other using a standard protocol known as Transmission Control Protocol/Internet Protocol (TCP/IP). Internet use has been simplified and promoted by the advent of the World Wide Web ("the web" or "WWW") and Internet navigation tools such as Netscape™ and Mosaic™. The web is a worldwide network of sites where easy-to-use, multimedia information is made available to Internet users. Typically, Internet subscribers may have information that they wish to share with other interested users of the Internet. A subscriber designs a home page or a web site comprising a catalog of information that is to be made available to interested users. The home page is provided with an address on the web. By using a web navigation tool such as Netscape, users anywhere on the Internet can enter the address of the web site to access the catalog. The navigational software then locates the net site specified by the address, bringing the catalog of information to the user's computer screen.

The home pages and web navigational tools allow consumers to browse and purchase selected software titles over the Internet, among other datasets. The brief title descriptions and, in some cases, limited-use versions of software allow consumers to make better software purchase decisions on-line, eliminating a time consuming and often unproductive visit to a software retailer. In addition, software publishers benefit from the Internet because the cost of manufacturing and distributing information regarding software over the Internet is relatively low when compared with manufacturing, packaging and purchasing retail space. Consequently, the profit margin from software distribution via the Internet is increased in comparison with that of current retail distribution systems for software.

In addition to software distribution, government entities and businesses owning datasets, such as digital, aeronautical and satellite images of the surface of the earth are also looking for a better system for distributing their products. Potential consumers for these data products include municipal planning and service departments, public utility companies, real estate developers, engineers, architects and market location specialists.

Government research facilities have been collecting satellite and aeronautical images of the earth for a number of years to create orthoimages and topographical maps, to characterize physical geography, and to manage forests (e.g., track forest fires), among other applications. Selling the earth imaging data has been considered recently to generate revenue; however, the infrastructure with which to market the data has been lacking in the past. Datasets such as those of the Geographic Information Services (GIS) are typically very large, i.e., on the order of terabytes. These large datasets can now be transmitted economically using CD-ROM or Internet technology. Imagery and other topographical data can be merged with spatial data such as census results, for example, and become a powerful tool for a wider range of applications, such as the creation of demographic data superimposed upon a map for use by consumer marketing companies.

A number of systems have been developed for delivering digital information using CD-ROM technology. These systems do not propose an Internet solution and are not modular. Upgrades to the system, therefore, require development of a significant amount of program code.

A number of on-line data publishing and purchasing systems have also been developed. One system allows businesses with a large volume of commercial data to build their own databases and to add functions and otherwise create browsers for the web to search for specific datasets in the databases. If the desired information is found, the data is electronically wrapped with a cryptographic algorithm which prevents a user from accessing the data until credit is established. This system is disadvantageous because the searching and encryption methods used are expensive to implement. Further, it is configured for use on the Internet only, and does not work on large files that are appropriate for distribution on CD-ROM.

Another system allows information providers to distribute secure information over the Internet via a secure Netscape commerce server. This system is disadvantageous because information providers cannot encrypt individual datasets. Further, a separate server must be purchased from Netscape, and the data to be distributed into datasets reorganized and then moved onto the server. This system is similarly not available for use with CD-ROM. The security feature provided by the Netscape server is not extended to a server for a CD-ROM.

Another on-line purchasing system allows products to be encrypted individually on a server. This system allows information providers to download, encrypt and publish data on the Internet via the server. Internet users are provided with a security access key for a fee. This system, however, is characterized by poor encryption and security implementation, as well as poor previewing capabilities.

Another system allows users to browse and purchase stock photographs on-line using a Netscape server. This system comprises an Oracle database, a custom common gateway interface to access, preview and store the data, and a CyberCash device for credit card transactions, among other hardware. This system, however, is expensive and is relatively slow when downloading data.

A need exists for a data distribution system which is capable of downloading digital data to users from different devices (e.g., CD-ROM, the Internet or other networks such as a satellite communications network) in a manner that maintains the location of the data transparently with respect to most system software components. Since the options for storing and transporting secured data are increasing, a need exists for a data distribution system which can locate datasets anywhere within an information provider's network.

A need also exists for a data distribution system which allows persistent encryption of individual datasets, that is, data that remains encrypted even if it is copied around by an authorized user. In contrast, unauthorized users can copy around a Netscape server to obtain data that is no longer secured. Further, a need exists for a data distribution system that allows information providers to organize datasets for different applications using different levels of security, yet ship the entire catalog of datasets on a single CD-ROM, for example. Datasets that are secured independently of a server, therefore, are not at risk when the server is compromised.

Since a number of business issues relating to Internet commerce have yet to be resolved, a majority of information providers have selected CD-ROM technology as their medium of choice for distributing data. A need exists, however, for a data distribution system that offers a seamless transition from CD-ROM-based data distribution to data distribution on the Internet.

In addition, a need exists for a data distribution system which has a modular architecture and is flexible, allowing providers to purchase a base system at reasonable cost and as many software modules as needed to build a custom data distribution system to suit their needs. For example, an information provider may wish to use a different encryption technology without having to redevelop other system software modules. Further, a modular architecture can be upgraded, modified, or operated on a different operating system with minimal software development.

Finally, a need exists for a method of authorizing access to encrypted data which prevents the unlocking of datasets on unauthorized computers or by unauthorized users. This is particularly important as public terminals become available from which users can access and purchase secured data.

SUMMARY OF THE INVENTION

In accordance with an aspect of the present invention, a system for distributing digital data among a plurality of customers is provided which has a modular software architecture. The system software comprises a kernel having a kernel operating system interface for communicating with the host operating system on the customer computer, and a plurality of kernel modules for managing search, encryption, compression, purchasing transactions and other functions. The kernel modules communicate with each other and with the host operating system via events posted to and retrieved from a kernel event queue. A dispatcher module is provided which retrieves events from the kernel event queue and routes them to the appropriate kernel modules.

In accordance with another aspect of the present invention, the kernel is programmed to dynamically load and unload selected ones of the plurality of kernel modules depending on the events retrieved from the kernel event queue.

In accordance with yet another aspect of the present invention, the kernel comprises at least one requester module for maintaining the storage location of the datasets transparently with respect to the plurality of kernel modules. The datasets can be stored in a plurality of different storage locations, such as a network server, a database server, a web site server, a portable storage device, as well as on the hard drive of the customer computer.

In accordance with still yet another aspect of the present invention, the plurality of kernel modules are platform-dependent, while the rest of the kernel software is platform-independent. Different sets of kernel modules can be programmed using application programming interface functions of different operating systems.

In accordance with still yet another aspect of the present invention, product codes sent by the customer to purchase a selected dataset, and release codes for decrypting the selected dataset, are generated in a manner which renders them computer-dependent to protect against unauthorized use of the selected dataset.

BRIEF DESCRIPTION OF THE DRAWINGS

These and other aspects and advantages of the present invention will be more readily apprehended from the following detailed description when read in connection with the appended drawings, which form a part of this original disclosure, and wherein:

FIG. 13 is a computer screen illustrating the fields in a record created for each kernel module in accordance with an embodiment of the present invention;

FIG. 21 illustrates a portion of a location database table in accordance with an embodiment of the present invention;

DETAILED DESCRIPTION OF THE PREFERRED EMBODIMENTS

Figure 1:
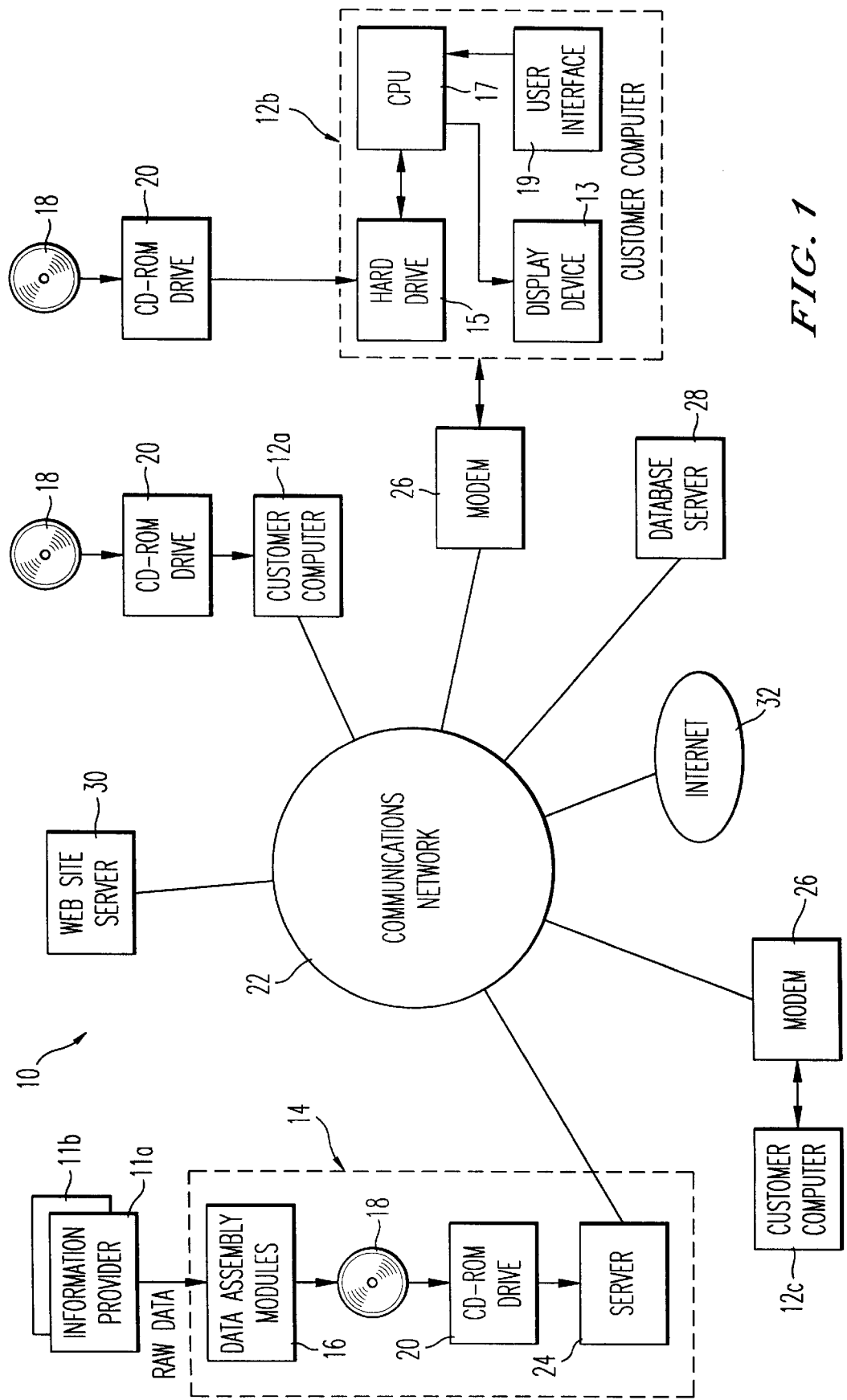
FIG. 1 is a schematic block diagram of a data distribution system (DDS) constructed in accordance with an embodiment of the present invention.

The data distribution system (DDS) 10 of the present invention allows customers or end-users to browse or search through data available from a number of information providers and to purchase selected data directly via their respective computers. FIG. 1 illustrates exemplary hardware components for implementing the DDS 10. Three customer computers 12a, 12b and 12c, which are hereinafter collectively referred to a customer computers 12, are shown in FIG. 1 for illustrative purposes. The computers 12 are preferably conventional personal computers or workstations which comprise a monitor 13, an optional hard drive 15 or other local memory device, a central processing unit 17 and a data input device 19 such as a keyboard or a mouse. The computers 12 can operate using one of a number of operating systems (OSs) developed for IBM-compatible or Macintosh computers or the UNIX operating system, for example. The computers 12 can also be workstations having no local memory device.

With reference to FIG. 1, information providers 11 such as government research facilities with earth imaging data and software publishers can provide raw data such as digitized maps and program code, respectively, to a fulfillment center 14. The fulfillment center 14 comprises dataset assembly modules 16 which arrange and organize the raw data into datasets. It is to be understood that substantially any type of information that can be digitized can be assembled as a dataset for viewing and purchasing via the DDS 10, and that datasets are not limited to maps and software. The datasets can be verified by the information providers 11, encrypted and stored, for example, on a master copy of a portable data storage device 18 such as a compact disc read-only memory (CD-ROM). The master CD-ROM 18 is then mass-produced and distributed to the customers. Datasets from more than one information provider 11 can be stored on a single CD-ROM 18. Further, other types of portable data storage devices 18 can be provided with datasets and distributed such as digital audio tapes and magnetic diskettes.

Customers can access selected datasets from one or more CD-ROMs 18 via a CD-ROM drive 20 at their computers 12. Alternatively, the CD-ROM(s) 18 can be read from a CD-ROM drive 20 at the fulfillment center 14 that is accessed via a communication network 22 and a server 24. Thus, a customer computer 12c that is not connected to a CD-ROM drive 20 can have on-line access to the datasets at the fulfillment center 14 via a modem 26 or other network interface device. The network 22, for example, can be a public switched telephone network, an optical fiber network, a satellite network, a microwave or cellular communication system or a combination of different types of communication networks.

Figure 2:
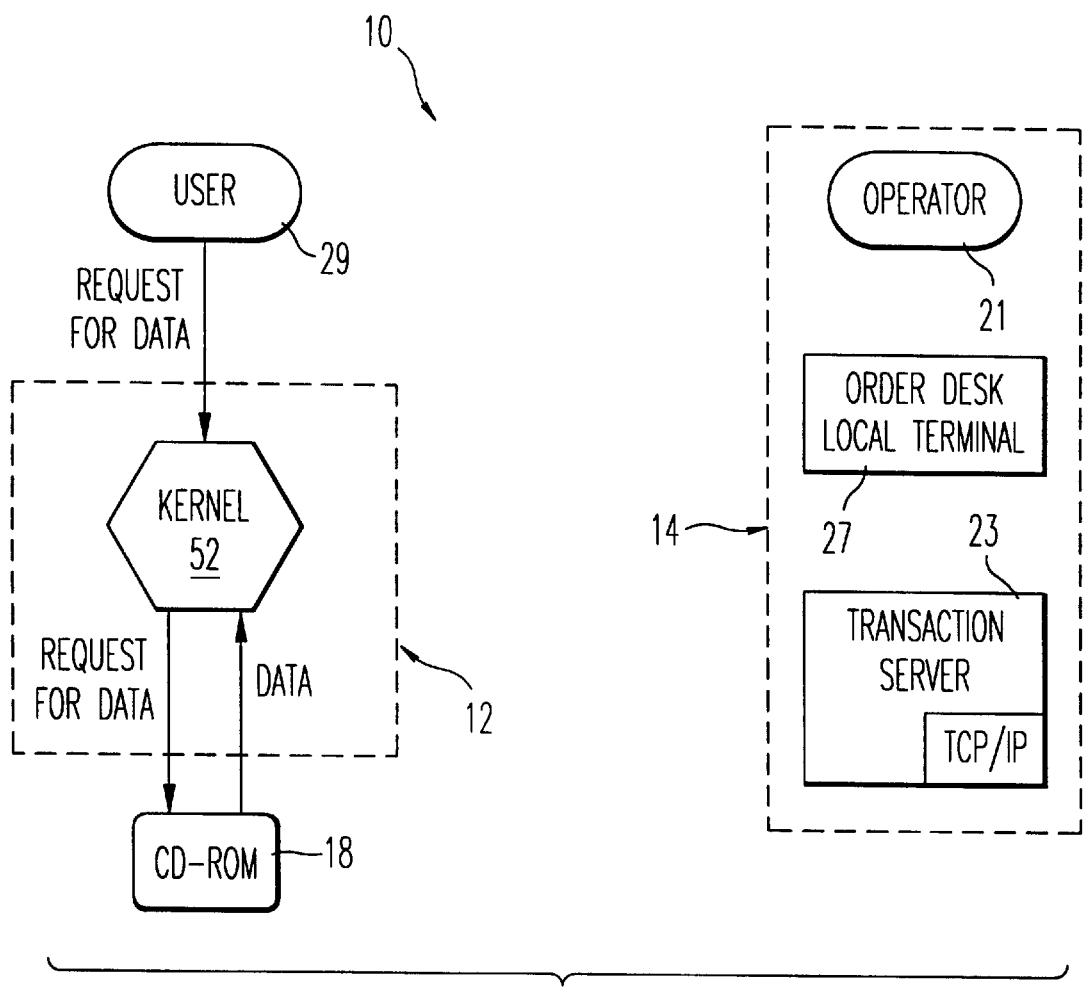
FIGS. 2 and 3 are schematic block diagrams illustrating DDS components constructed in accordance with an embodiment of the present invention for requesting encrypted data stored on a local portable storage device and receiving an access or release code to unlock that data.
Figure 3:
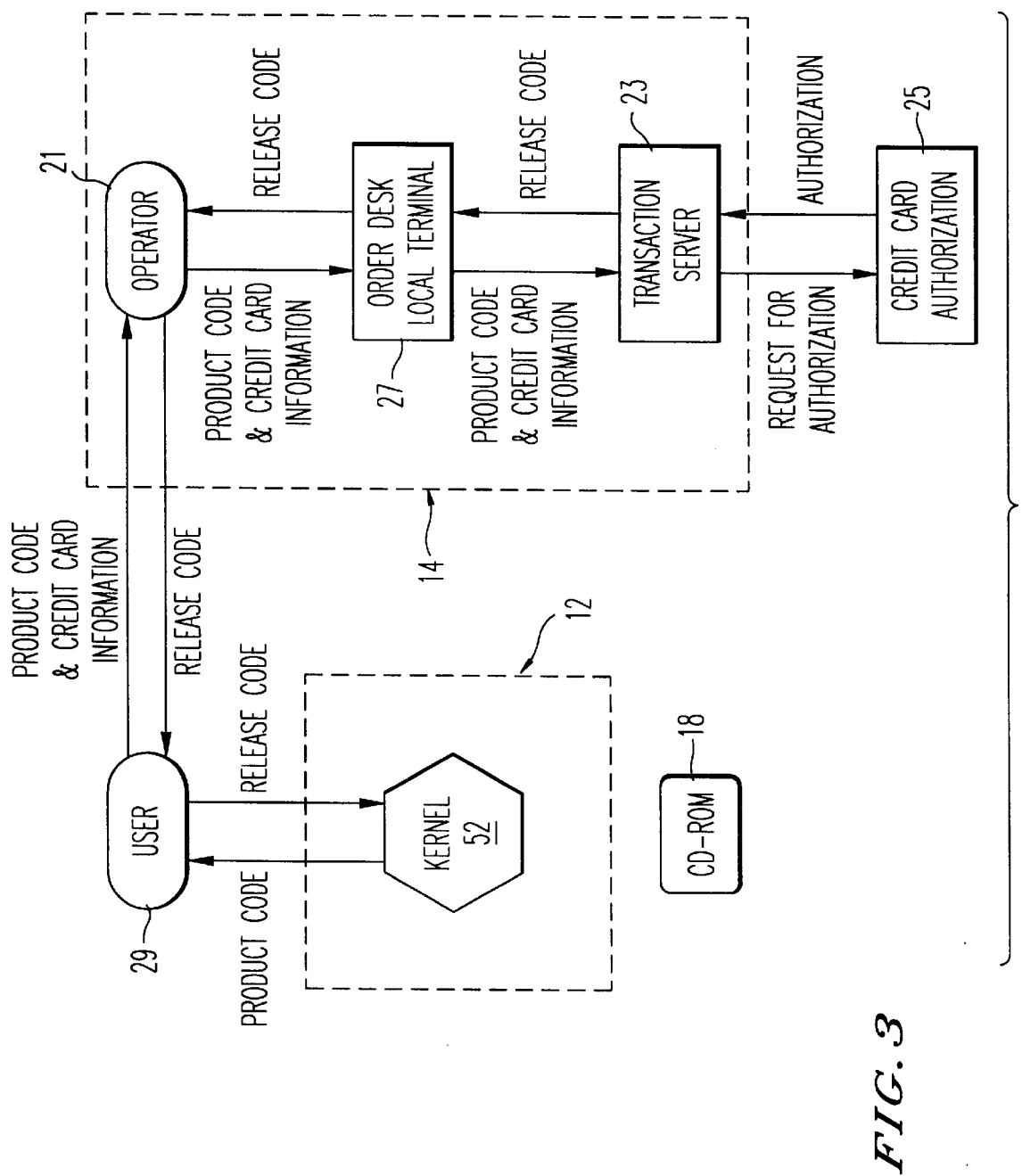
Figure 4:
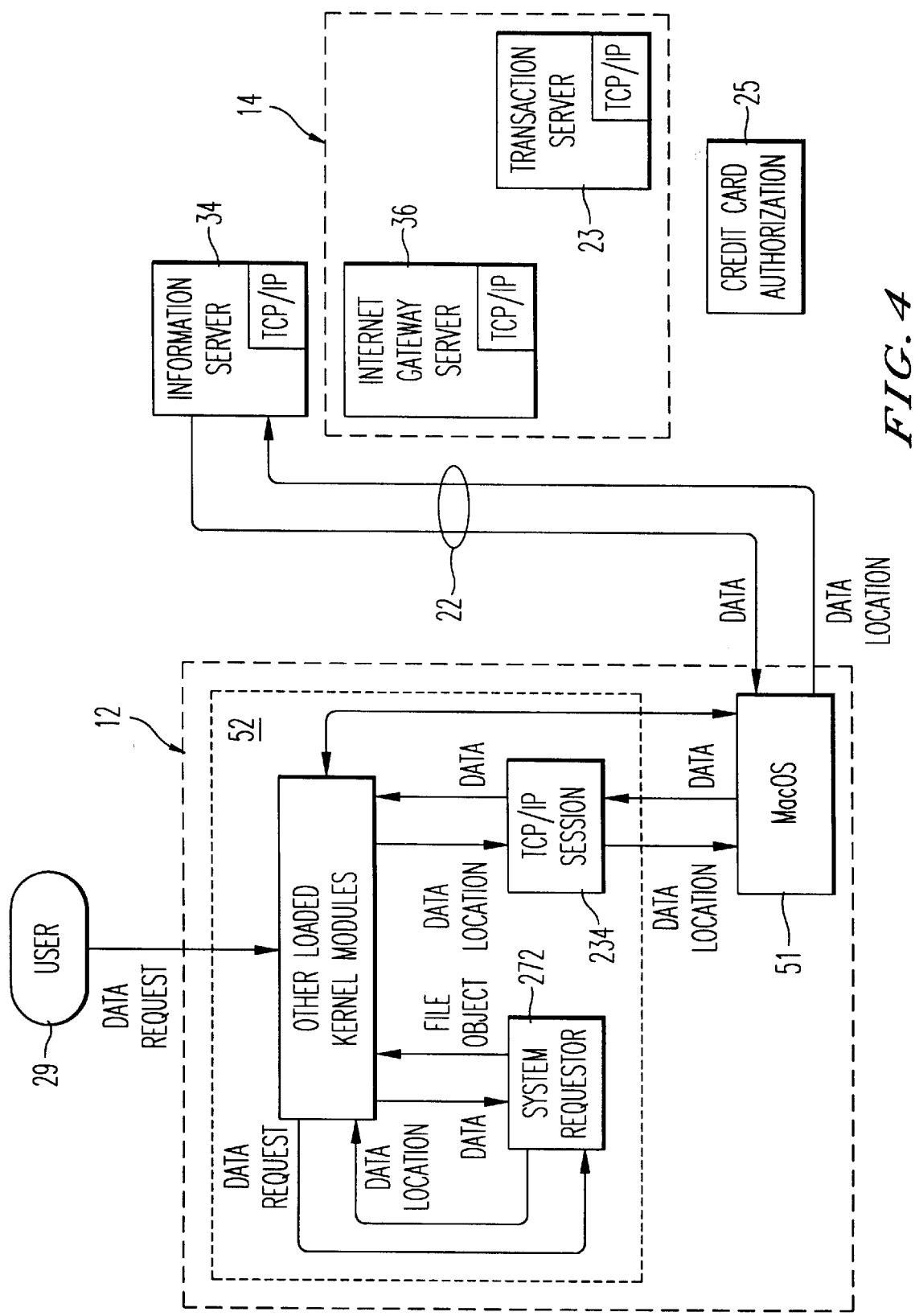
FIGS. 4 and 5 are schematic block diagrams illustrating DDS components constructed in accordance with an embodiment of the present invention for purchasing data stored on a server located remotely with respect to the customer computer.
Figure 5:
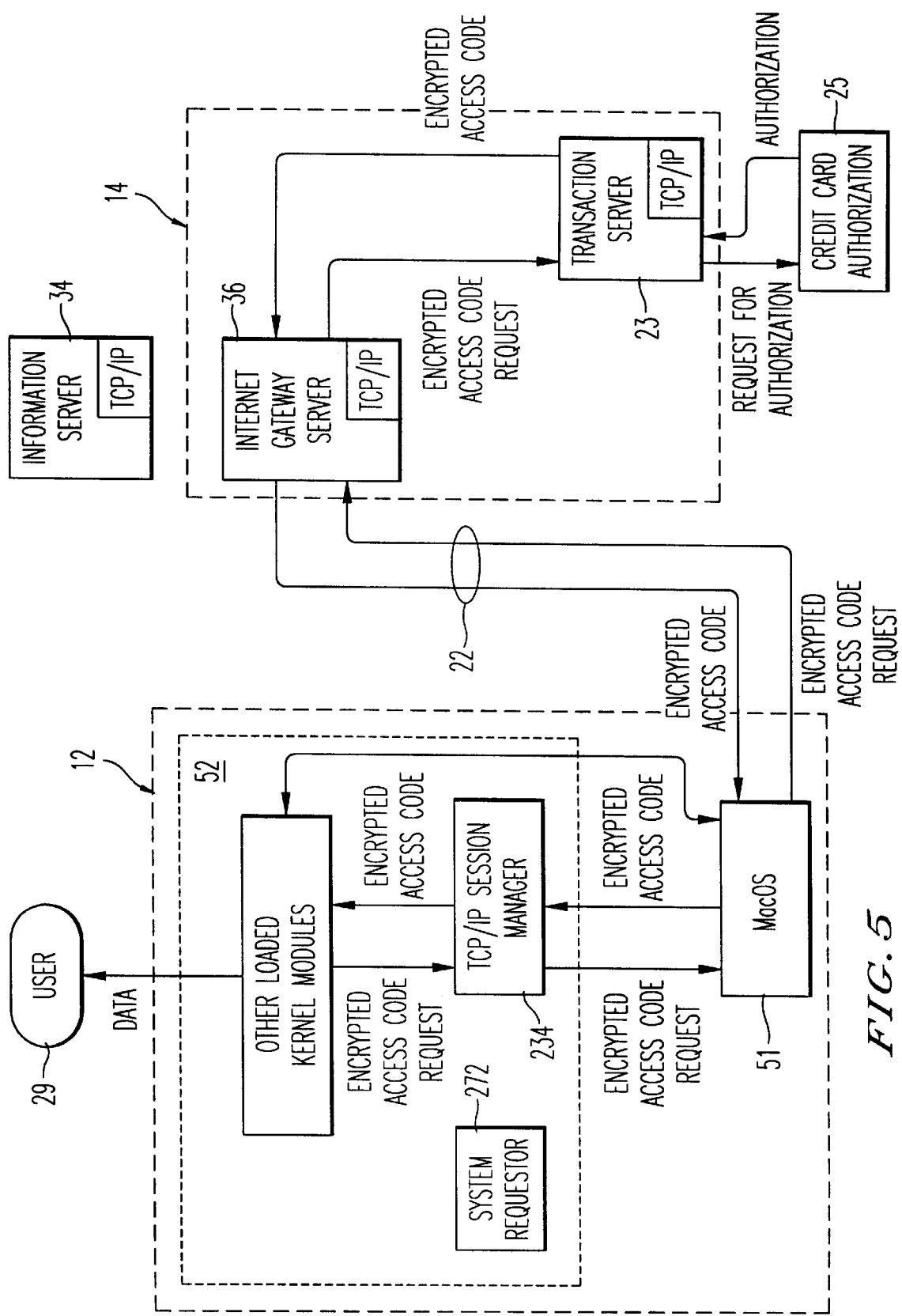

With continued reference to FIG. 1, the datasets can be stored on a relational database server 28, on a WWW server 30 at a web site, on an Internet 32 installed at a corporate or university campus, and other shared memory devices, as well as on portable memory devices 18 at the customer computer 12 and at the fulfillment center 14. The flow of data between a customer and an information source such as a fulfillment center 14, a local CD-ROM at the customer premises or a remote third party provider is illustrated in FIGS. 2–5. FIGS. 2 and 3 illustrate distribution of datasets from a CD-ROM 18 to the customer computer 12a or 12b. FIGS. 4 and 5 illustrate distribution of datasets from a remote location to the computer 12b or 12c.

As will be described in more detail below, the customers can browse and search datasets, and then purchase selected datasets for downloading directly to the hard drives 15 of their computer 12. With reference to FIG. 2, the computer 12 is programmed to process a request for a dataset from an end-user 29 by locating the data on the CD-ROM 18. Dataset purchases are made by contacting the fulfillment center 14 via a telephone using a 1-800 telephone number, for example, or via facsimile to obtain an access or release code from an operator which releases or unlocks the requested dataset, as shown in FIG. 3. Upon connection, the customer preferably speaks a product code for the dataset he or she wishes to purchase to an operator 21, sends a facsimile message, or enters the code on a telephone keypad or via the user interface device 19. The customer 29 can also give the operator 21 his or her name. If the customer is already in a customer database maintained at the fulfillment center 14, a transaction to purchase the data follows; otherwise, customer information is first entered by the operator. The product code is entered into an order terminal 27 and processed by a transaction server 23 to generate a release code. Once a payment method is agreed upon (i.e., credit or bank account debit cards) and the financial transaction authorized (e.g., by a credit card authorization service 25), the operator 21 either verbally provides the release code over the telephone to the customer 29 or transmits the number via DTMF tones or facsimile to the customer computer 12 to complete the transaction. The dataset can then be decrypted using the release code.

If the computer is configured to access the network 22 (e.g., computers 12b and 12c), a request from a user 29 for a particular dataset is processed by the kernel 52, as described in further detail below, to initiate a connection via the operating system 51 of the computer 12 to a remote information server 34. The server 34 can be operated by a third party, as shown in FIG. 4, or by the fulfillment center (e.g., server 24 in FIG. 1). The server 34 or 24 provides the requested dataset to the computer 12. Regardless of where the information server is located, a connection is made to the fulfillment center 14 via a gateway server 36 to transmit an encrypted access or release code request for the desired dataset, as shown in FIG. 5. The transaction server 23 in turn provides the computer 12b or 12c with an access or release code via the gateway server 36 and the network 22 after a payment method is established. The access code is processed at the computer 12 to decrypt the dataset.

As will be described in further detail below, the DDS 10 can generate user-dependent product codes (i.e., the codes only work on the purchaser's computer to prevent distribution of the release code or a posting of it on the Internet) and access or release codes to verify that the customer is permitted to have access to the requested data; however, other types of authorization codes can be used. For example, release codes can be generated which are useful for only a predetermined period of time. The length of the release and product codes is dependent on the level of security desired by the information provider 11 for individual datasets. A number of encryption algorithms can be used to encrypt the datasets, and more than one algorithm can be used on the datasets simultaneously. The DES (Data Encryption Standard) algorithm and the RSA RC4 algorithm, however, are preferably used.

As shown in FIGS. 3 and 5 the fulfillment center 14 manages financial transactions and maintains demographic information about the customers. After a purchase of information is made, a payment for the purchase of a dataset is relayed to the information provider 11, thereby allowing financial transactions to be fully audited and the purchases and flow of funds traced. Alternatively, a third party can be employed to manage customer accounts and transactions and payments to the information providers 11. The demographic information maintained by the fulfillment center 14 can comprise, for example, customer purchase history and product purchase information and can be used by information providers 11 for marketing purposes. The fulfillment center 14 can generate invoices upon customer request which can be sent to the customer via facsimile or mail, or sent directly by modem to the information provider for processing.

Figures 6, 7:
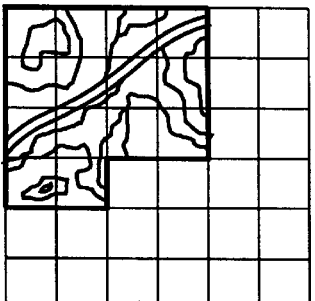
FIG. 6 is a screen that can be generated on an information provider's computer or at a fulfillment center in accordance with an embodiment of the present invention to guide an operator when creating an encrypted dataset.
FIG. 7 is a screen that can be generated on a customer computer for in accordance with an embodiment of the present invention for guiding the customer when selecting a dataset.

Each dataset is preferably characterized by four records, that is, the type of data which constitutes the dataset, the price for purchasing the dataset, the dataset name and a brief description of the dataset for search purposes, respectively. The dataset records are maintained in a location database on the CD-ROM 18, or other memory device at the fulfillment center 14. FIG. 6 illustrates a screen 38 generated by the dataset assembly module 16 for guiding an operator when creating datasets from raw data. Additional information for describing the dataset can be entered into these records. For example, the length and sampling rate of a data set comprising a segment of digital audio can be entered, along with other sound-specific information. An information provider can offer customers a number of features to speed the entry of information when selecting a dataset, such as presetting fields that are displayed on a dataset order screen generated on the display device or monitor 13 of the customer computer 12, or grouping similar data types.

In the data assembly modules 16, the hierarchy of the purchasable data, as well as groups or collections of purchasable data, are organized and provided with icons, titles and group titles as desired by the information provider 11. Previews are subsequently added to the data. Information providers can opt to provide previews and brief descriptions of the datasets, along with the actual data that is to be sold, on the CD-ROM 18 or information server 34. Customers can therefore sample and preview datasets before deciding to purchase them. The previews are typically screens generated on the monitor 15 of the customer computer 12 which reveal a part of a digitized map or a limited-use version of a software program, for example, as well as instructions for purchasing the dataset. With reference to the preview screen 40 depicted in FIG. 7, the screen associates different maps datasets to a group of datasets. Each cell 48 in the grid 50 corresponds to a dataset which has a title. The entire grid 50 has a group title. After the previews and descriptive information have been organized and verified by the information provider 11, the data are encrypted and linked to the purchasable data in the datasets and stored on a CD-ROM 18, for example. Their storage locations are stored in the location database.

The software architecture of the DDS 10 will now be described with reference to FIG. 8. The software architecture comprises a kernel 52 having a number of DDS software modules 54a, 54b, and 54c, which are collectively referred to as DDS modules 54. The kernel 52 maintains an operating environment in which these DDS modules 54 function, and runs on top of the host operating system 51 of the customer computer 12. The kernel 52 also comprises a number of functional components which are described below to create a modular, multitasking, cross-platform, multimedia data distribution system.

The kernel 52 is the foundation for a modular software architecture. The kernel 52 is designed to take up a minimal amount of disk space and operating memory. Portions of the software architecture are dynamically loaded and unloaded on to the hard drive 15 of the computer 12 as needed, and can be developed, tested and re-used separately from the rest of the program code. The kernel 52 is preferably platform-independent and can run off a number of different host operating systems 51. For example, the kernel can be operated with the MacOS 7.x operating system for the PowerPC architecture and the Motorola 680x0 architecture, as well as the UNIX operating system, the WINDOWS NT, WINDOWS 95, WINDOWS 3.x and WINOS2 operating systems for the 80x86 architecture and MacOS2 and WINOS2 for the PowerPC architecture. It is preferably written using C++ and assembly programming languages. The DDS modules 54 are ported by rewording platform-dependent and operating system-dependent code.

The DDS modules 54 are preferably blocks of executable code and data that are preferably written in standard programming languages and development environments using the host operating system's application programming interface (API) functions. Thus, several sets of DDS modules 54 can be created for respective platforms in which the kernel 52 is used, such as the Macintosh Power PC or 680X0 architectures. The DDS modules 54 are preferably fully compiled and run as binary executables at the same speed as the native software of the customer computer 12. The DDS modules 54 communicate with the operating system 51 of the customer computer 12, the kernel 52 and with each other through events, kernel API services and operating system API services. The handling and posting of events represents a large portion of DDS module 54 functions. The DDS modules 54 post events to perform shared functions and to communicate with the kernel. The DDS modules 54 generate function calls to communicate with the operating system and other external services, respectively. There are preferably three main threads in the kernel 52, that is, a dispatcher thread, a base kernel thread and a common thread for the modules 54, and specific threads for the modules 54.

Figure 8:
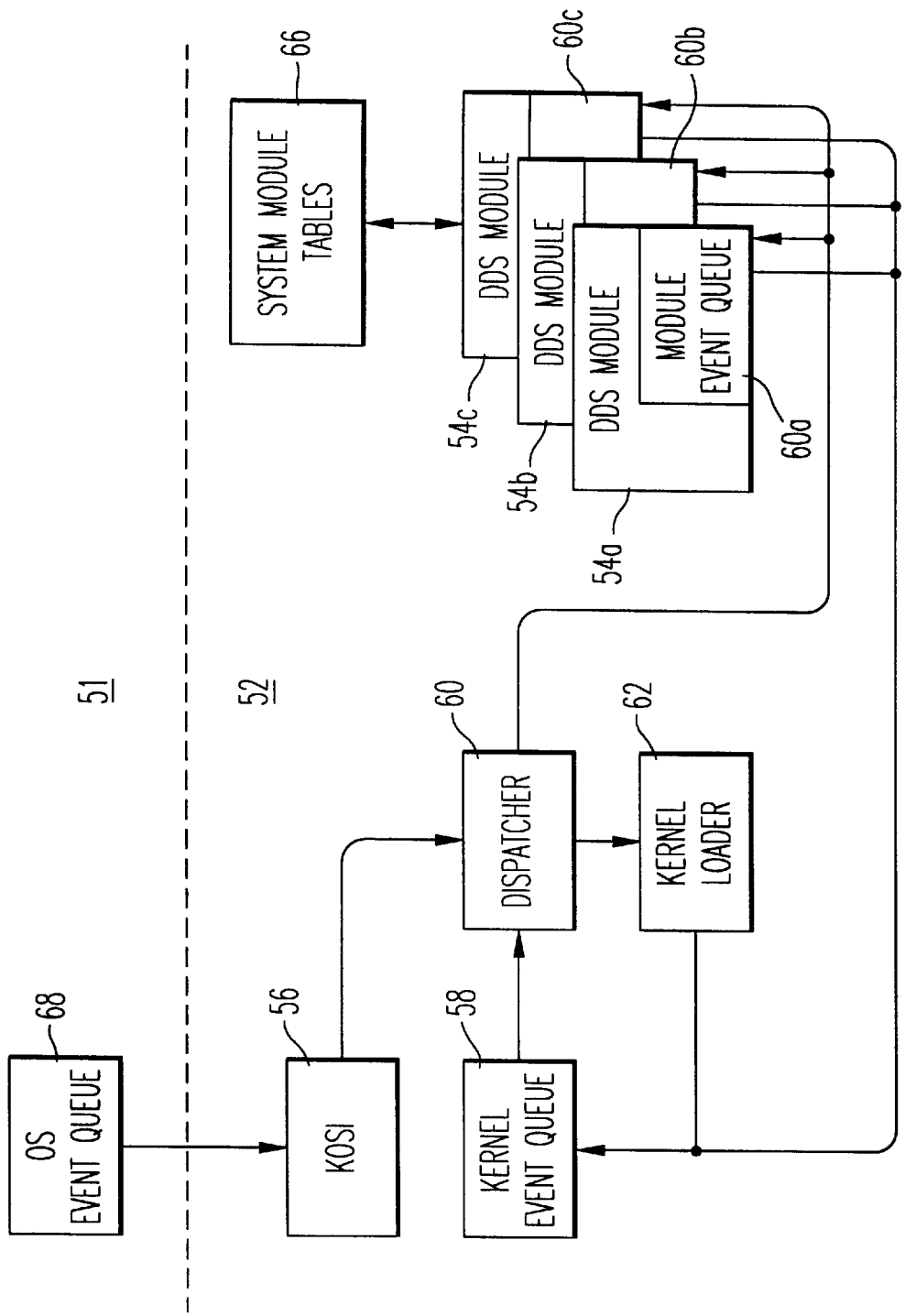
FIG. 8 is a schematic block diagram of a kernel constructed in accordance with an embodiment of the present invention for operating the DDS.

With continued reference to FIG. 8, the kernel 52 comprises a kernel operating system interface (KOSI) 56 to establish a connection with the host operating system 51, and to manage event-based communications between the operating system 51 and the kernel 52 such as translating an operating system event or message into a kernel event which is then stored in a kernel event queue 58. These operating system events run as the base kernel thread of the kernel 52 to perform initialization and deinitialization of the kernel 52, and to invoke a kernel dispatcher 60. The kernel dispatcher 60 retrieves events from the kernel event queue 58, determines where the events are to be sent using internal tables developed upon start-up of the kernel, and then routes the events to respective module event queues 60 which correspond to the destination DDS modules 54. As stated previously, the dispatcher 60 preferably runs on its own thread. The kernel 52 also comprises a kernel loader 62 which operates in conjunction with the dispatcher 60 to dynamically load and unload module code and data to and from the hard drive 15 and the CD-ROM 18 as needed to save memory space, as well as to maintain multiple module instances.

As stated previously, the kernel 52 supports exported function calls which are used by the DDS modules 54 to perform specific functions that are not accessed by posting events. These functions are hereinafter referred to as kernel service routines and are categorized as user interface (UI) management routines for generating windows and menus on the display device 13, and module management routines (e.g., module registration at start-up and during module loading and unloading). The modules can also access external functions via function calls (hereinafter referred to as service libraries) to access, for example, a part framework or preemptive multitasking libraries.

Figure 9:
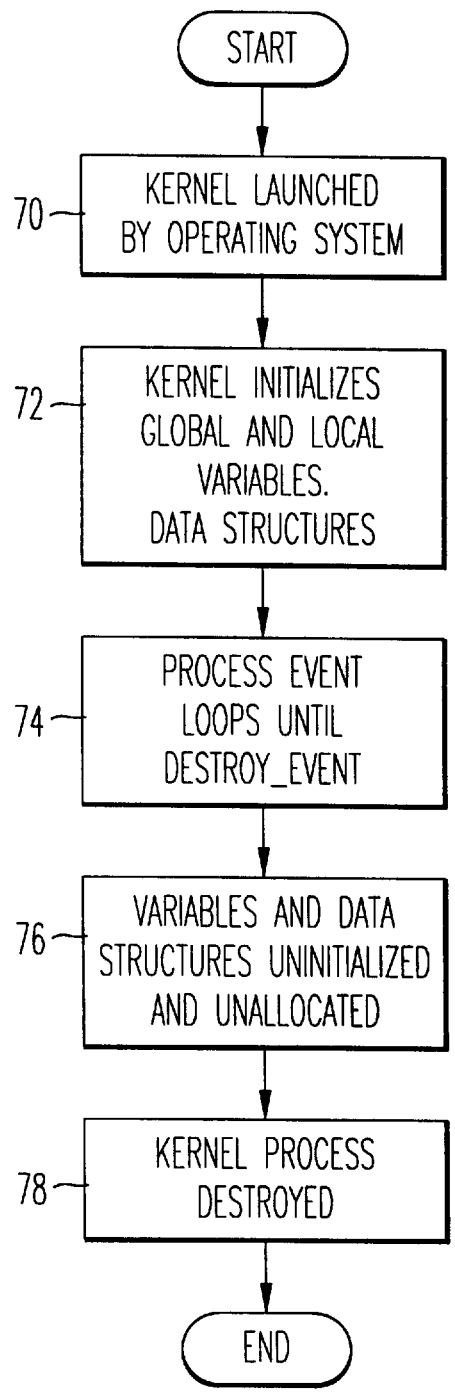
FIG. 9 is a flow chart illustrating the sequence of operations for initializing a kernel in accordance with an embodiment of the present invention.

Kernel 52 initialization and data flow will now be described with reference to FIGS. 9 and 10, respectively. Each customer computer 12 in the DDS 10 is provided with the kernel 52 either on the CD-ROM(s) 18 or by accessing the server 24. The kernel 52 is initialized by the operating system 51 (block 70 of FIG. 5) and sets up critical data structures and tables for kernel operation (block 72). After the operating system 51 and the kernel 52 are fully initialized, an event called EVENT_CREATE is posted in the kernel event queue 58. The dispatcher 60 retrieves the EVENT_CREATE event and loads one of the DDS modules 54 called a start-up module 54c, which is shown in FIG. 4 (block 74). The start-up module 54c searches for other available modules 54a and 54b and builds a system module table 66 and other related data structures. The start-up module 64 then begins to load selected ones of the modules 54, such as user interface and preview modules which are described below in connection with FIG. 14.

In a fully preemptive, thread-based operating system, the primary kernel 52 functions are preferably in a separate thread from the kernel loader 62. The dispatcher 60 continues to retrieve events from the kernel event queue 58, and the operating system 51 continues to post events in the kernel event queue 58, until the operating system 51 posts an EVENT_DESTROY event to the kernel event 58 queue which has the kernel 52 as its destination. The kernel 52 in turn processes all pending events and posts EVENT-DESTROY events to all active DDS modules 54 (block 76) before deinitializing itself (block 78).

Figure 10:
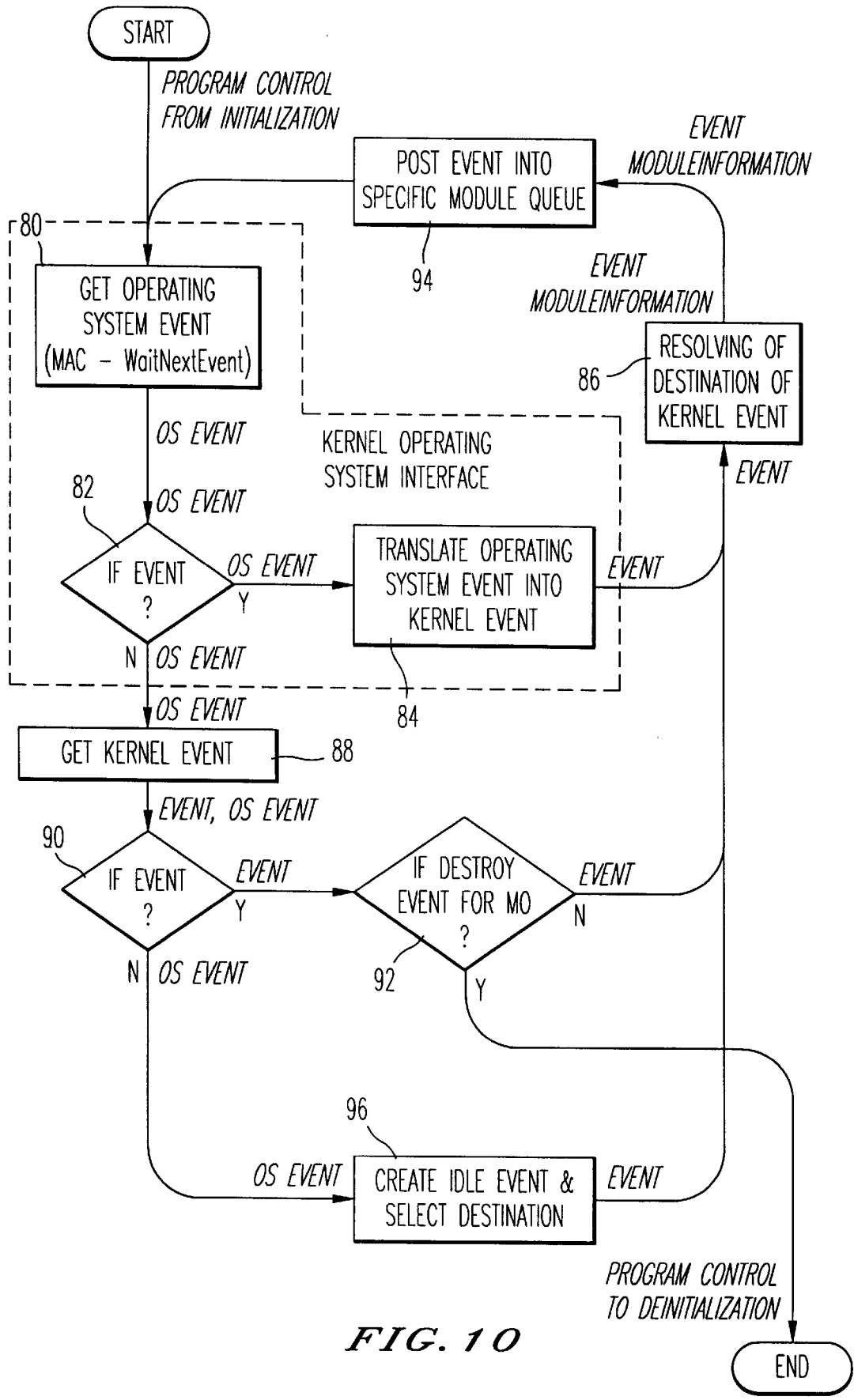
FIG. 10 is a flow chart illustrating the sequence of operations for processing events in a kernel constructed in accordance with an embodiment of the present invention.

An event loop is shown in the flow chart of FIG. 10. Following program control and initialization, an operating system event is retrieved from an operating system queue 62 which is shown in FIG. 4 by the KOSI 56 (block 80). Operating system events are translated into kernel events (blocks 82 and 84) before being resolved into an event for a specific DDS module 54 (block 86). The kernel 52 is otherwise programmed to retrieve an event from the kernel event queue 58 when no operating system events have been posted in the operating system event queue 62 (block 88).

If the event is not an EVENT_DESTROY event (blocks 90 and 92), the dispatcher 60 determines the destination of the event and posts it into a specific module queue 62 (blocks 86 and 94); otherwise, the program control of the kernel 52 is deinitialized as indicated by the affirmative branch of block 92. If there are no events in the kernel event queue 58, the kernel 52 is programmed to create an idle event and to select a particular destination module at which to commence processing after the next event is posted (block 96).

Figure 11:
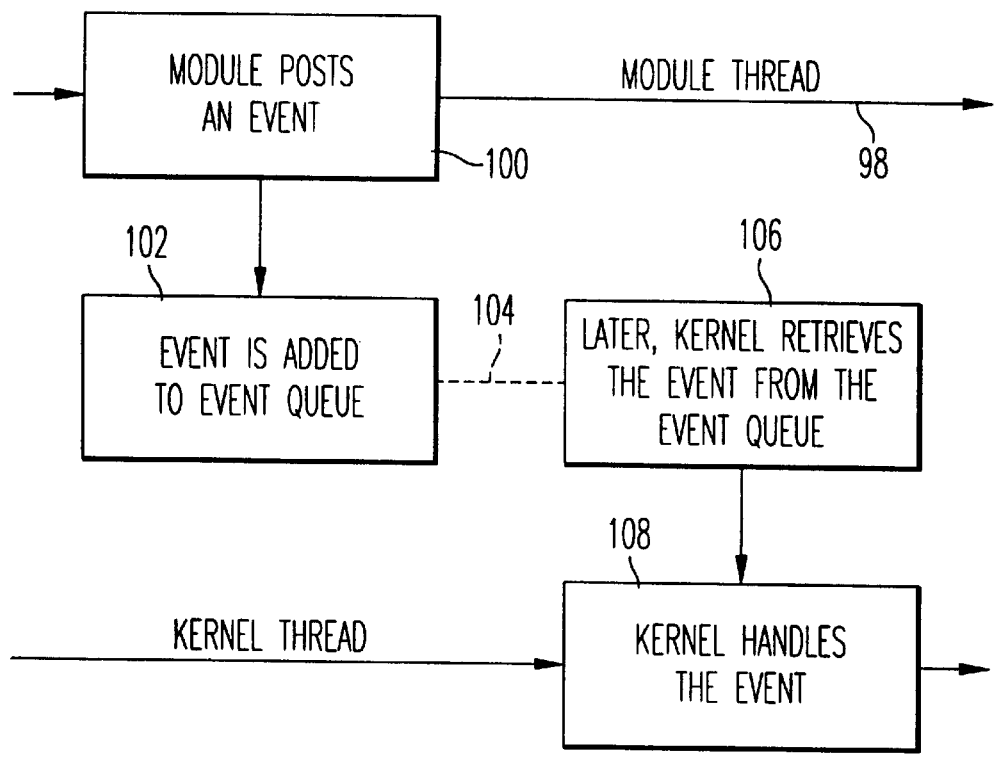
FIG. 11 is a diagram illustrating a kernel thread and a module thread in accordance with an embodiment of the present invention.

The multi-threaded architecture of the kernel 52 is illustrated in FIG. 11. The kernel 52 preferably initiates all module threads (e.g., thread 98) with an event. A module 54 can post an event or send an event that is stored in a shared data structure (block 100). The event is added to the kernel event queue 58 (block 102). The kernel 52 regularly checks the events in the kernel event queue 58 and can retrieve an event at a later time (block 106), as indicated by the broken line 104. The event is dispatched to the correct destination DDS module 54 via its own kernel thread (block 108). The event queue is not accessible to other threads when modules are posting events or when the kernel is retrieving events.

Figure 12:
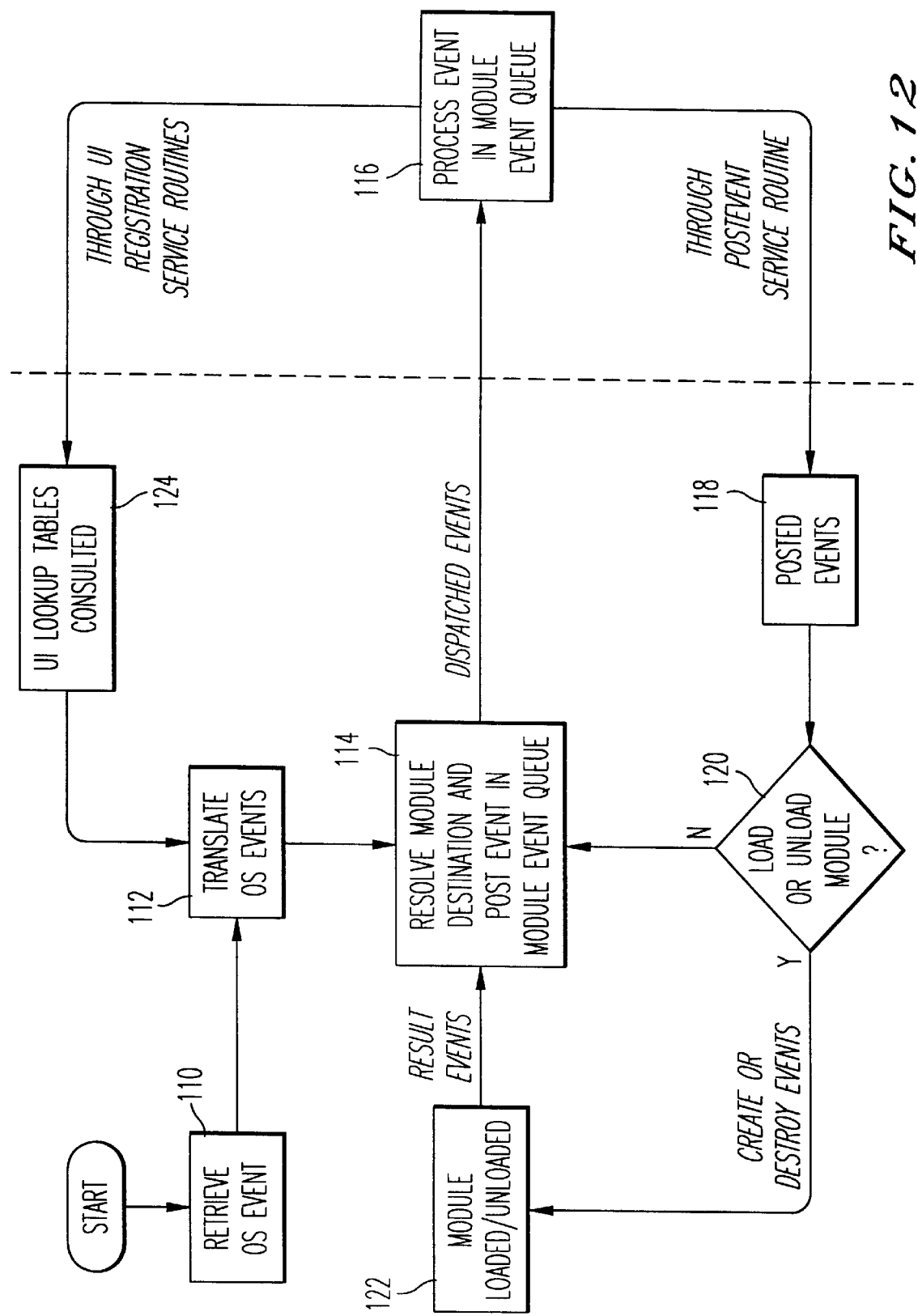
FIG. 12 is a flow chart illustrating the sequence of operations for loading and unloading kernel modules and processing events in accordance with an embodiment of the present invention.
Figure 14A:
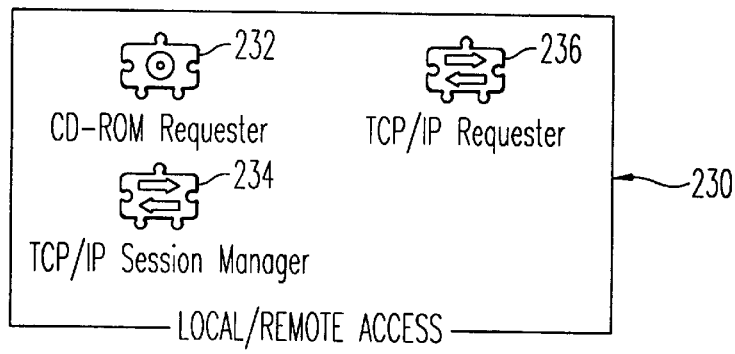
FIG. 14 is a screen that can be generated on an information provider computer or fulfillment center computer illustrating a number of kernel modules that are available for use in a kernel in accordance with an embodiment of the present invention.
Figure 14B:
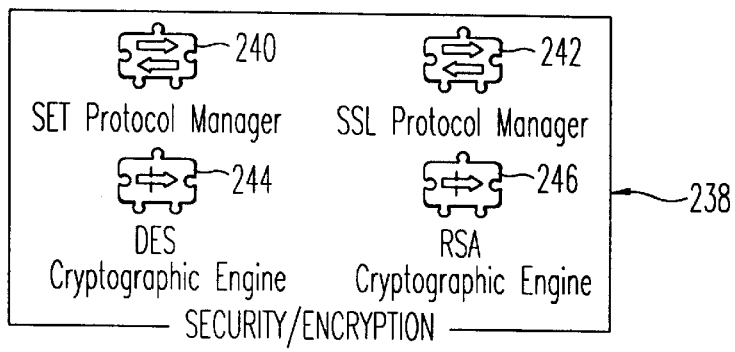
Figure 14C:
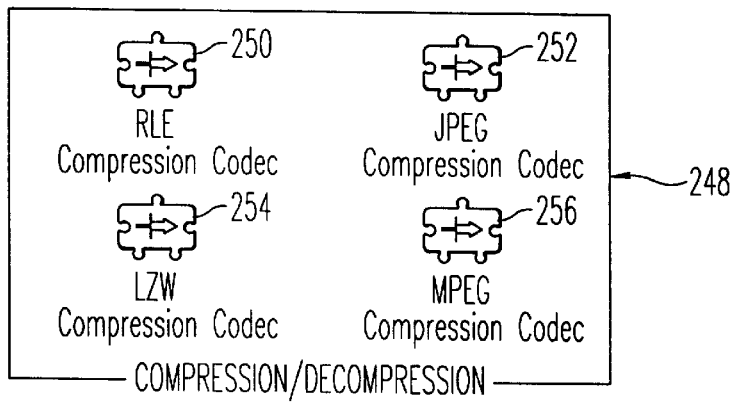
Figure 14D:
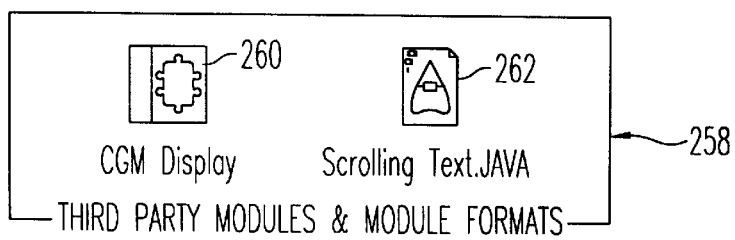
Figure 14E:
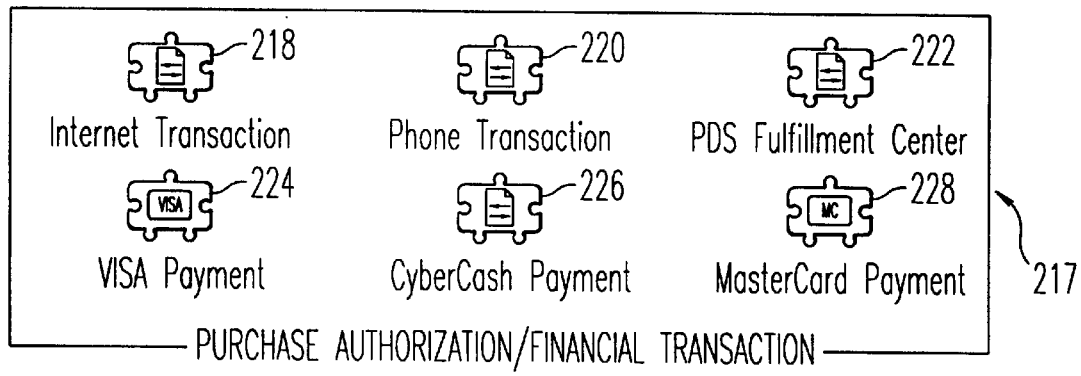
Figure 14F:
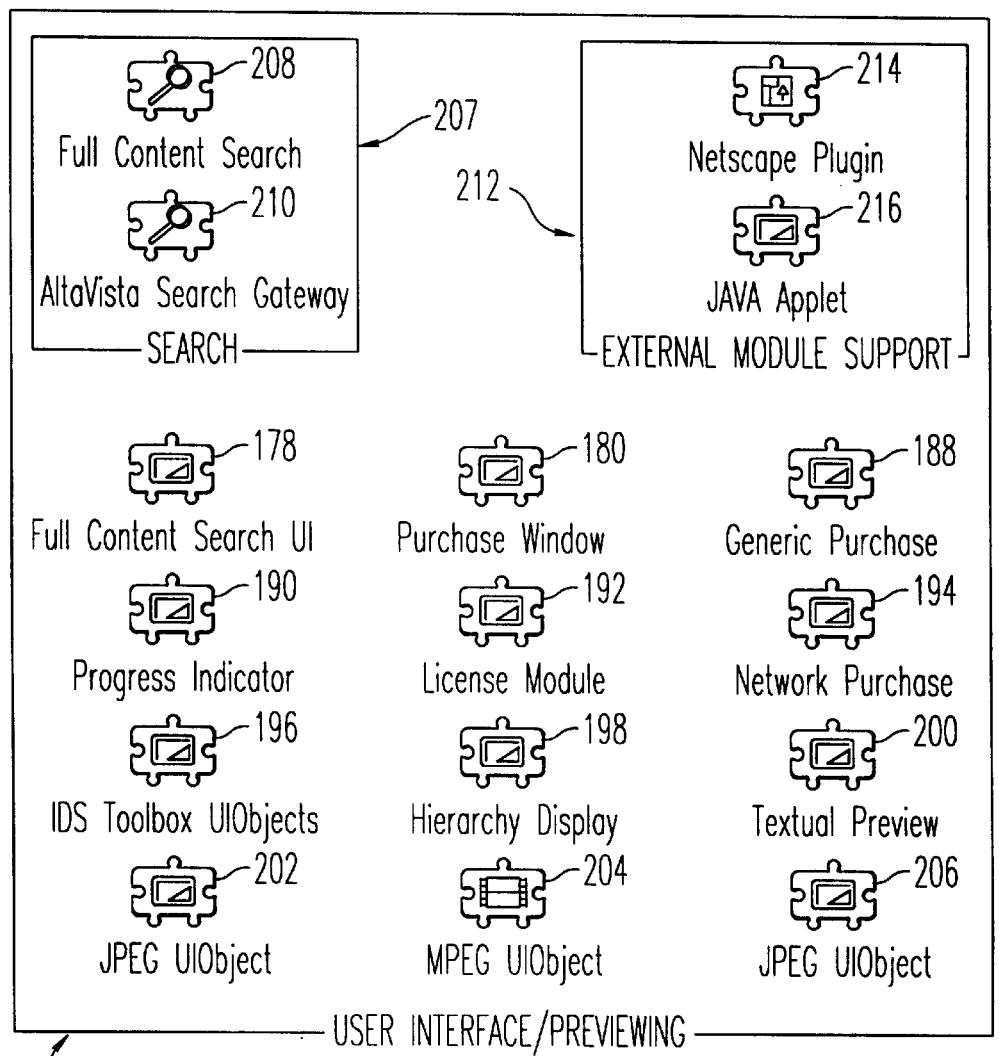

FIG. 12 illustrates kernel event flow, as well as function calls. An operating system event is retrieved from the operating system event queue 68 (block 110) and translated into a kernel event (block 112). The dispatcher 60 resolves the destination of the kernel event (block 114) and dispatches it to the destination DDS module 54 for posting in its module event queue 60 (block 116). The DDS modules 54 can post events to the kernel event queue 58 (block 118). The dispatcher 60 determines whether the events call for the initialization or termination of processing by a particular module (block 120). In accordance with the affirmative branch of decision block 120 and block 122, the kernel loader 62 loads and unloads selected modules 54 depending on the event and object in question. The DDS modules 54 in turn load event(s) into the kernel event queue 58. When modules are not posting events, they are creating function calls such as user interface registration service routines to look-up tables (block 124) for communication between the kernel 152, the operating system 51 and user interface devices 13 and 19 of the customer computer 12.

As shown in the flow chart of FIG. 12, the DDS modules 54 pass data to the kernel via events. The format of an event is preferably an eight field structure comprising the following fields: event type, destination, destination instance, source, source instance, time stamp, message and related data. The type of event can be signified using alpha-numeric codes which are defined in the kernel 52. The destination is the DDS module 54 to which the event is dispatched. The destination instance indicates to which of the destination module instances the event is dispatched. The source and source instance represent the DDS module 54 that posted the event and its corresponding instance. The time stamp field indicates the time at which the event was posted by the source module. The message and related data fields represent event-dependent data, and a pointer to where more event-dependent data is stored in memory, respectively. The format of the event data passed from the kernel 52 to the DDS modules 54 is preferably the same as the format of kernel inputs from the DDS modules. As stated previously, the kernel 52 primarily responsible for dispatching events to the DDS modules 54, loading and unloading selected DDS modules 54 to and from the hard drive 15, providing service routines to the DDS modules 54, as well as module registration services.

Every DDS module 54 preferably comprises a module information resource record (MIRR) 128 which contains information used by the kernel 52 for initializing and deinitializing the DDS modules 54. FIG. 13 depicts an exemplary MIRR for the DDS start-up module 54c. The MIRR 128 comprises a number of fields, including a Module Identification field 130 which comprises a unique identification code that was assigned to that module during the module development process. The Storage Type field 132 indicates how the module is stored, for example, as a Macintosh 680x0 platform module or a PowerPC platform module. The Events Accepted Mask field 134 indicates which events should be dispatched to that particular module such as an idle event, mouse events, keyboard events, update and activate events, disk events, operating system events and high-level events. The operating system events and high-level events can preferably be dispatched to only one module 54 in the kernel 52. The mouse events and keyboard events are dispatched preferably to only user interface modules.

Module Version field 136 and the Kernel Version field 138 in an MIRR 128 indicate the current version of the module 54 and the lowest version of the kernel 52 that supports the module 54, respectively. The Module Checksum and Signature fields 140 and 142 are used by a system requester module 272, which is described below, to ensure that a particular module 54 is error-free, is registered, and comes from a valid source (i.e., has not been altered). The Module Type field 144 represents high-level information about a DDS module 54 that is available to other modules 54 for routing purposes. This field indicates what groups of modules 54 a particular module 54 belongs to. For example, module types can include a start-up module, a data viewer module, a hierarchy viewer module and a dataset location addition module. The Module Data Type field 146 contains high-level information about what type of data the module can process and is used mainly for data viewer modules. For example, a module that displays Graphics Interchange Format (GIF) files would have GIF-type module data. The Module Creator field 148 contains information about who developed the module and which can be used to identify families of modules.

The MIRR 128 comprises a number of flags. The Uses Local Resources flag field 150 indicates, for a module supported by a Macintosh operating system, whether or not its resource fork is open or closed. The Has User flag field 152 indicates whether or not the module makes use of user interface functions in the host operating system. The Can Be Threaded flag field 154 indicates whether or not a module is compatible with running on its own thread and supports asynchronous event posting. The Is Application Code flag field 156 indicates that the module has no knowledge of the kernel 52 or DDS 10 and is a standard PowerPC container in a Macintosh operating system. If this flag 156 is set, the kernel 52 executes this module on a special module 54 thread. The Stream Module flag field 158 indicates if a module is a stream-type module. As will be described in further detail below, modules are classified as a stream module, a DDS UI object module or a user interface module. The DMS Compliant flag field 160 indicates whether or not the module is compliance with proposed Distributed Module Services (DMS) standards. The remaining fields 162, 164, 166 and 168 are reserved.

Most modules 54 in the DDS 10 are user interface (UI) modules which usually register a window on the display device 13 and use the host operating system's user interface and screen drawing libraries. UI modules are preferably the only modules to receive user interface-type events from the operating system 51. Stream modules process a dynamic stream of data. For example, a module that decompresses or encrypts a data stream is a stream module. If a module uses any functions from the Macintosh QuickDraw libraries, it is preferably a user interface module in order to be compatible with the Copland BlueBox standard. DDS UI object modules interface directly with the kernel 52 and are identified by the presence of an MIRR resource in the resource fork if they are created using the MacOS or MIRR file. A UI interface module controls the contents and activities of one or more windows, such as a GIS previewer module which generates the screen depicted in FIG. 7. A DDS UI object module is a module that is responsible for a specific area on a window such as "accept" button 170. A UI object module is written according to UI object specifications and is called using function calls from the DDS modules 54.

External modules can be provided in the DDS 10 which are developed according to a different module architecture than that used with the DDS 10. External modules are supported by wrapper DDS modules that enumerate, translate communications for, and otherwise maintain external modules. The DDS 10 is designed to have a Netscape plug-in module to accommodate plug-ins designed for use in the Netscape Navigator software. Plug-in modules can also be provided for a JAVA Applet and a MacOS application.

The various DDS modules 54 will now be described in further detail with reference to FIG. 14. The screen depicted in FIG. 14 can be generated by the kernel 52 to allow an information provider or operator at the fulfillment center 14 to view the different module options and to create a custom DDS 10 or to modify or create new modules 54. These modules represent a set of modules which can be potentially downloaded to the hard drive 15 of a customer computer 12 by the kernel 52 whenever necessary. It is to be understood that other DDS modules 54 can be developed and used with the kernel 52 in addition to the ones depicted in FIG. 14.

Figure 16:
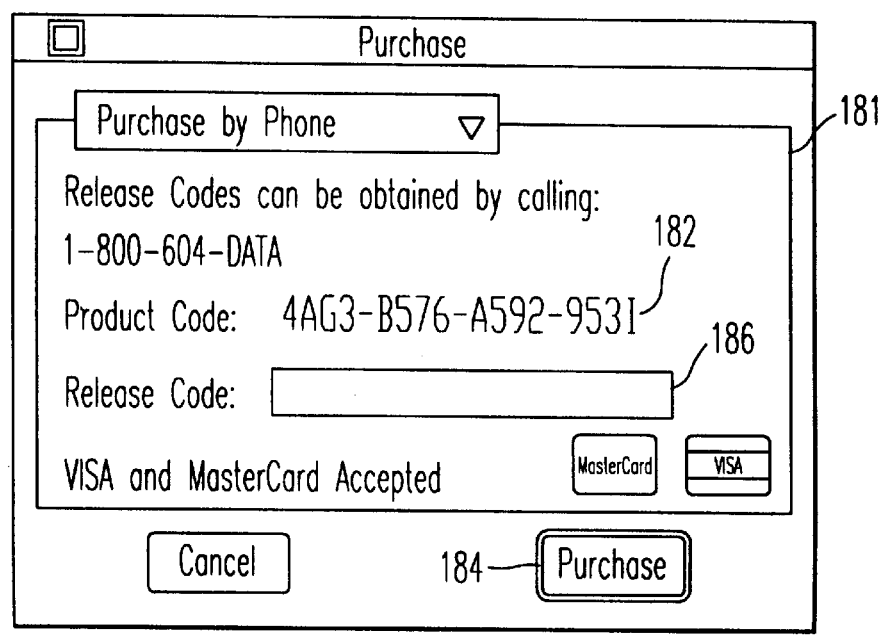
FIG. 16 is a screen that can be generated on a customer computer for guiding a customer when purchasing a selected dataset in accordance with an embodiment of the present invention.
Figure 15:
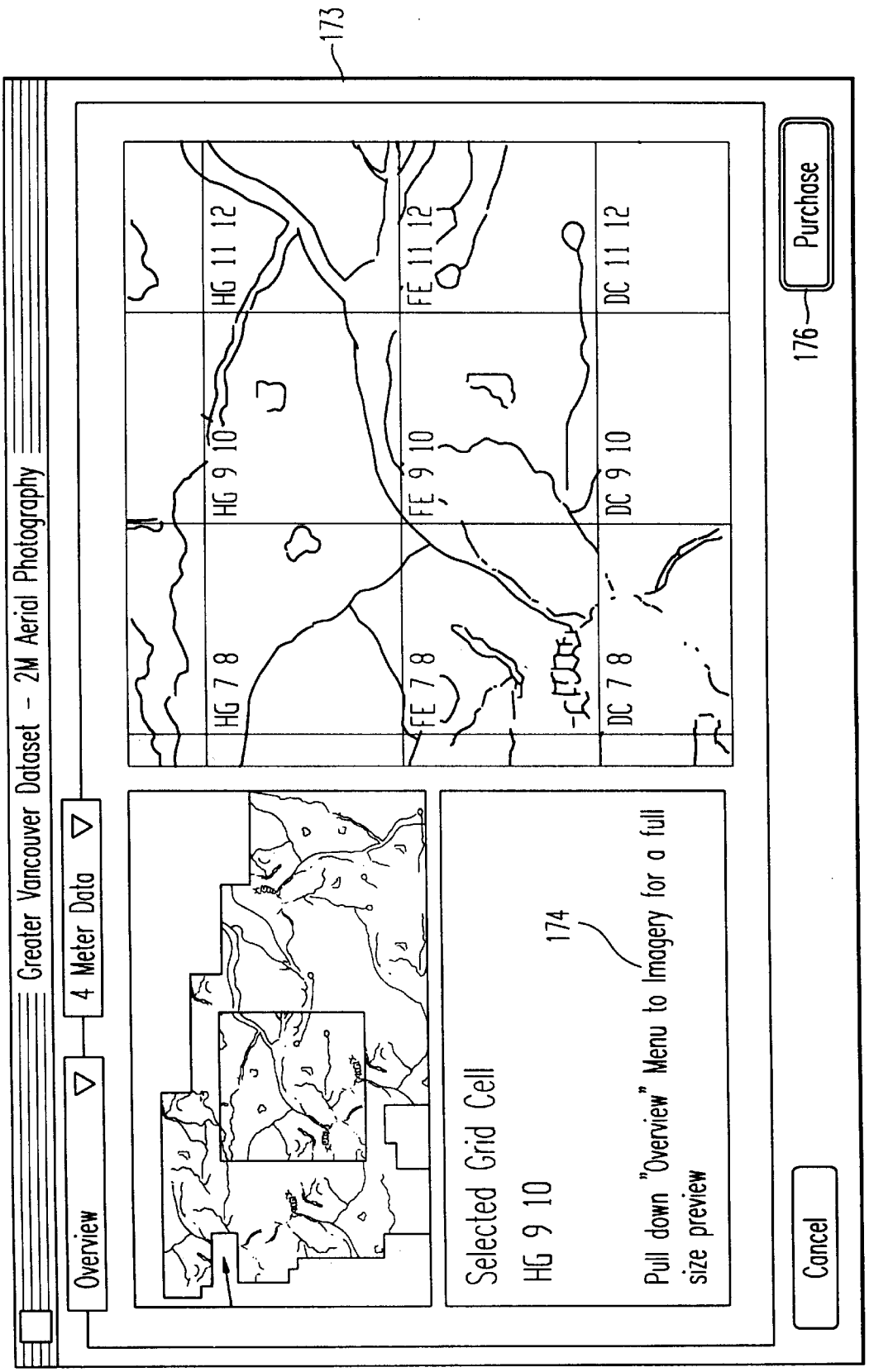
FIG. 15 is a screen which can be generated on a customer computer for guiding a customer when previewing and selecting a dataset in accordance with an embodiment of the present invention.

Following start-up, the customer computer 12 is provided with at least one of the user interface or preview modules 172 which allow the customer to search for and view the available datasets by title, for example, and to preview particular datasets in the DDS 10. These modules 172 can generate screens which provide the customer with instructions for purchasing selected datasets. Exemplary GIS previewer and purchasing screens are depicted in FIGS. 15 and 16. For example, the GIS screen 173 depicted in FIG. 15 provides the dataset item (i.e., 4 meter aerial orthophotography), the group (i.e., Greater Vancouver Regional District map), the dataset price, as well as instructions to preview or purchase the data by double-clicking on the "preview" and "purchase" parts 174 and 176 on the screen, respectively. The Full Content search UI module 178 provides a user interface for searching for a particular dataset based on, for example, text or key words entered by the user. The Purchase Window screen 180 provides a user interface for a purchase window 181 such as that shown in FIG. 16. Upon entering a product code 182 for a particular dataset and clicking on the "purchase" button 184, a release code 186 is generated by the fulfillment center 14 and either automatically displayed on the screen 181 or given verbally to the customer over the telephone by an operator at the fulfillment center 14. The Generic Purchase module 188 provides a user interface for creating a customized purchase screen and transaction similar to the screen 181 shown in FIG. 16.

With continued reference to FIG. 14, the Progress Indicator module 190 provides the user with progress feedback during downloading, decompression and decryption of datasets after the release code has been entered by the customer. The License module 192 and the Network Purchase module 194 are user interfaces for license windows and options and for site license network-based purchasing, respectively. The DDS Toolbox Parts module 196 provides the customer computer 12 with base parts used in the DDS system 10 such as a scrolling text box. The Hierarchy Display module 198 displays relationships and the organization of data on, for example, a CD-ROM, as well as allows navigation through the data. The Textual Preview module 200 provides for the display of previews of datasets for the customer. The Joint Photographic Experts Group (JPEG) UI object module 202, the Motion Picture Experts Group (MPEG) UI object module 204, and the Tagged Image File Format (TIFF) UI object module 206 provide for the display of a JPEG image, the playback of an MPEG video stream and the display of a TIFF image, respectively. Two specialized search modules 207 are provided, although other search modules can be added. The Full Content Search module 208 allows for data stored in any of the DDS datasets to be searched, and works in conjunction with the Full Content Search UI module 178 that operates the screen and user input devices for entering key words. The AltaVista Search Gateway module 210 provides for searching for related information on the worldwide web using a gateway and the AltaVista search engine. The External Module support modules indicated at 212 include a Netscape plug-in UI object 214, which allows Netscape plug-ins to be used by the DDS 10 as if they were a native DDS UI object, and a JAVA Applet UI object 216, which allows JAVA Applets to be used as if they were a native DDS UI object.

FIG. 14 does not display a number of modules, such as the start-up module 54c, and the system requester module 272, which manages data requests, performs information routing and caching and is described below. Further, a Facsimile Transaction module is available but not shown in FIG. 14. The Facsimile Transaction module provides a user interface for automatically generating a facsimile purchase form. A Portable Font UI object is also provided (but not shown in FIG. 14) to display text in a specific font with specific formatting.

After a customer has requested the purchase of a dataset, a number of transaction modules 217 are supported by the DDS 10 for authorizing the purchase and for managing the payment transaction. For example, the Internet Transaction module 218 and the Phone Transaction module 220 support financial transactions occurring over the Internet or other communication network and a telephone, respectively. The Fulfillment Center module 222 provides customized information for contacting a third party fulfillment center. The remaining modules 224, 226 and 228 allow the use of different credit cards or bank account debit cards as payment options.

The local and remote access modules 230 are shown in FIG. 10. The CD-ROM Requester module 232, the TCP/IP session manager module 235 and the TCP/IP Requester module 236 are selected as needed by the system requester module 272 and downloaded to the customer computer 12 to access and pay for datasets located on a CD-ROM 18, an Internet 32 or at a web site 30, respectively. Other local/remote access modules can be developed for retrieving data from different information sources. For example, an ODBC Requester module (not shown) can be created or connect the computer 12 to an Oracle RDBM server 28 via a local area network or Internet. Different specific requesters can be developed for various communication technologies, such as satellite communications, radio frequency or microwave communications, among others.

The DDS 10 can provide a number of different security/encryption modules 238 to handle various encryption protocols, such as modules 240, 242, 244 and 246 for handling, respectively, the Visa-Mastercard electronic commerce protocol (SET), the secure socket layer link encryption standard developed by Netscape (SSL), the Data Encryption Standard (DES) algorithm, and the Rivest, Shamir and Adelman (RSA) encryption algorithms and protocols.

Similarly, the DDS 10 modules 248 can provide information providers with options regarding the compression and decompression of datasets to be sent to customers, such as module 250 for run length encoding (RLE) compression of certain image formats at the computer 12, module 252 for the decompression of JPEG images, module 254 for the decompression of GIF images and text, and module 256 for the decompression of an MPEG video stream, among others. As stated previously, third party modules and module formats 258 are available, such as a CGM display module 260 for handling a Netscape plug-in for playing back a computer graphic metafile format image, or an imbedded JAVA Applet 262.

The modular architecture of the DDS 10 allows it to be more flexible as an information source than most existing data distribution systems. The modularity of the DDS architecture also allows adoption of other existing standards, as well as future standards, for such processes as file formatting (e.g., the Drawing Changes Format (DXF), the Macintosh PICT and the CGM standards), communications (e.g., the TCP/IP, HyperText Markup Language (HTML) and the HTTP standards), data manipulation (e.g., the JPEG and the MPEG compression algorithms) and security applications (e.g., the DES, RSA RC4 and Netscape's SSL encryption algorithms) with relative ease. Further, the modular architecture allows datasets to be written to substantially enter media without modification, such as CD-ROM, the Internet, digital audio tape, hard drives and PC cards. The DDS 10 can operate on substantially any operating system without modification, such as the DOS, WINDOWS, Macintosh and UNIX operating systems. As stated previously, the modular architecture is implemented using the kernel 52 for executing events, mapping operating system events into DDS events, loading and unloading modules 54 as needed and managing their instances separately, and supplying user interface registration services to facilitate operating system event dispatching.

Figure 17:
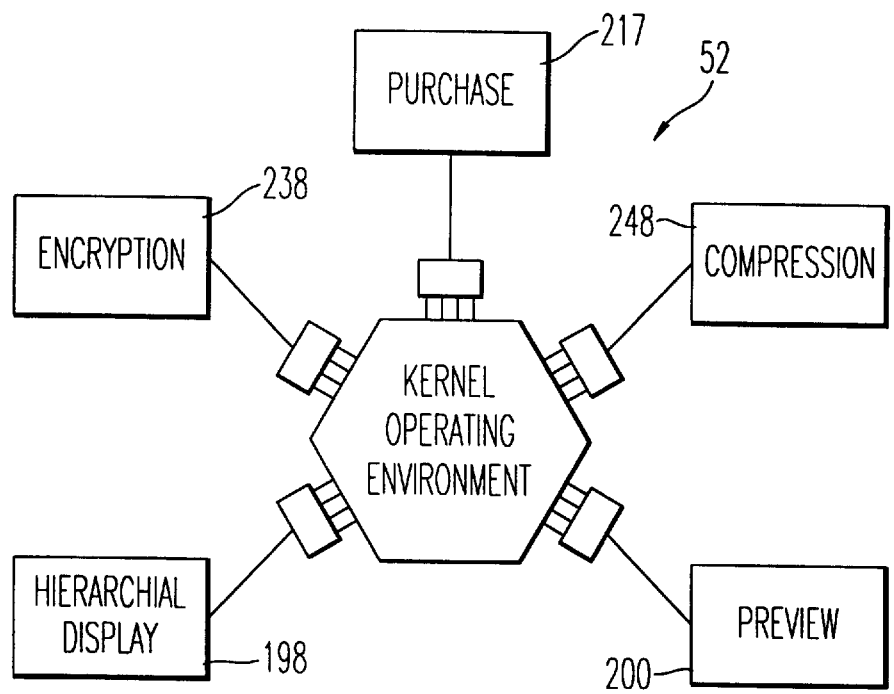
FIGS. 17 and 18 are schematic block diagrams, respectively, of basic and customized DDS modular architectures in accordance with an embodiment of the present invention.
Figure 18:
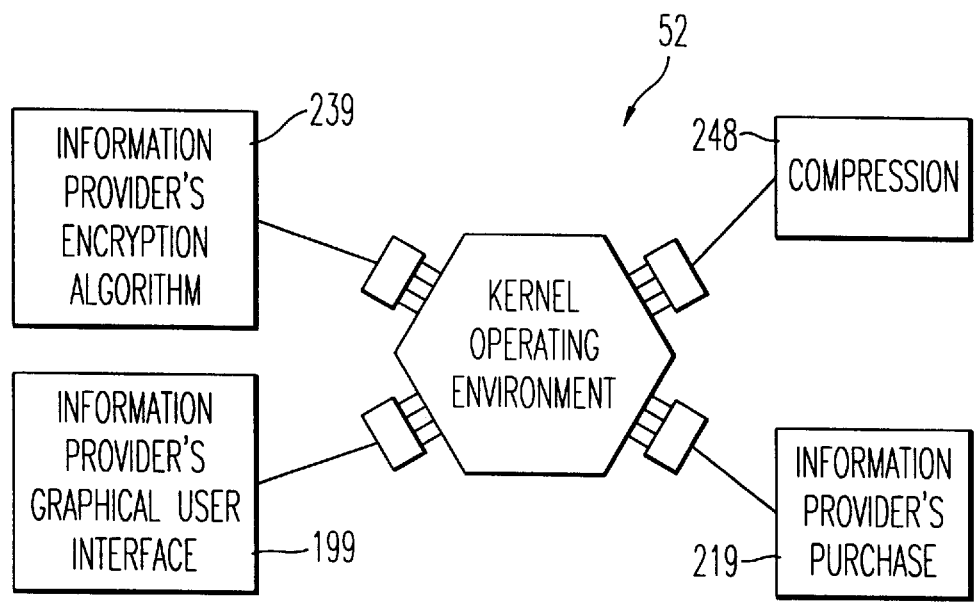

In accordance with another embodiment of the invention, an information provider can use the DDS 10 to perform many of the functions of the fulfillment center. The DDS 10 comprises software which allows information providers to configure their own datasets, as well as implement their own services, such as distribution of datasets and payment. Information providers 11 can purchase a base kernel 52, as shown in FIG. 17, with as many additional DDS software modules 54 as desired to build a customized data distribution system. The base kernel 52 the Hierarchy Display and Preview Modules 198 and 200, one of the Purchase modules 217, one of the Encryption modules 238 and one of the Compression modules 248. As shown in FIG. 18, an information provider 11 may wish to use customized software modules 239, 199 and 219, for example, to implement a proprietary encryption algorithm or use their own user interface and purchase transaction technology. Further, the information provider 11 can build a modular architecture having these customized software modules and upgrade the architecture on a modular basis, thereby avoiding significant programming changes. This is an advantage over monolithic data distribution systems requiring information providers to purchase a large system that is difficult to modify.

Figure 19:
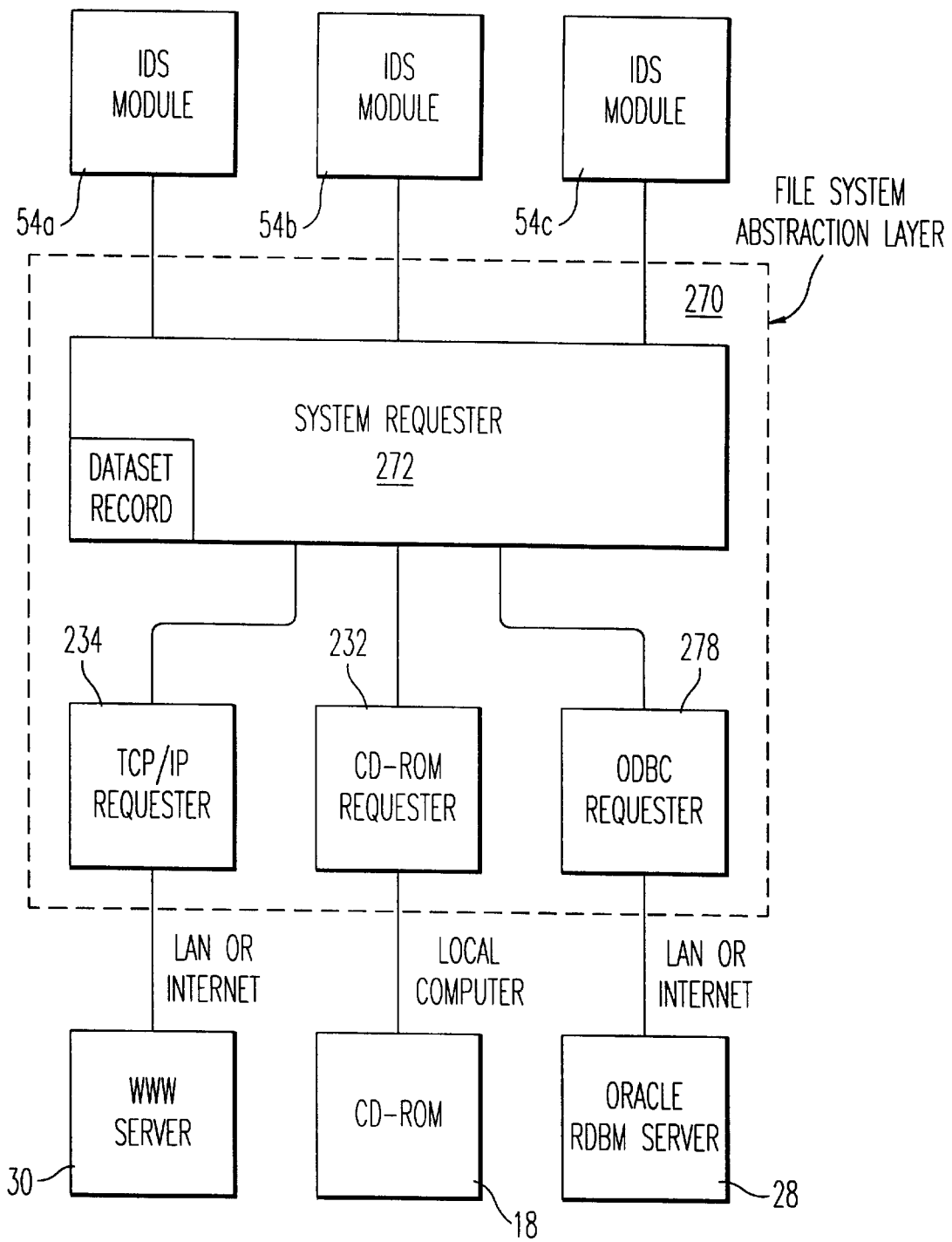
FIG. 19 is a schematic block diagram illustrating an abstraction layer in a kernel programmed in accordance with an embodiment of the present invention.

The modular architecture of the kernel 52 allows for the development of an abstraction layer such that the location of desired datasets is transparent with respect to the modules 54. With reference to FIG. 19, a number of requester modules, which are shown within the abstraction layer 270 of the kernel 52, are provided to allow independence of the DDS modules 54 from the transport technology and storage of the datasets. The abstraction layer 270 comprises a system requester 272 and a number of specific requester modules 234, 232 and 278 corresponding to different dataset locations, such as a WWW server 30, a CD-ROM 18 and an object database server 28 (e.g., an Oracle RDBM server). Communication between the DDS 10 and other medias or operating environments is implemented by developing additional requester modules. When an individual DDS 54 module posts an event, such as downloading a selected dataset, the system requester 272 which maintains a database of the location and version of all available datasets in the DDS 10, directs the request from the source DDS module to the specific requester module for handling the retrieval of the selected dataset. For example, a DDS module 54 requesting information residing on an Internet server is forwarded to the TCP/IP requester 234.

Figure 20:
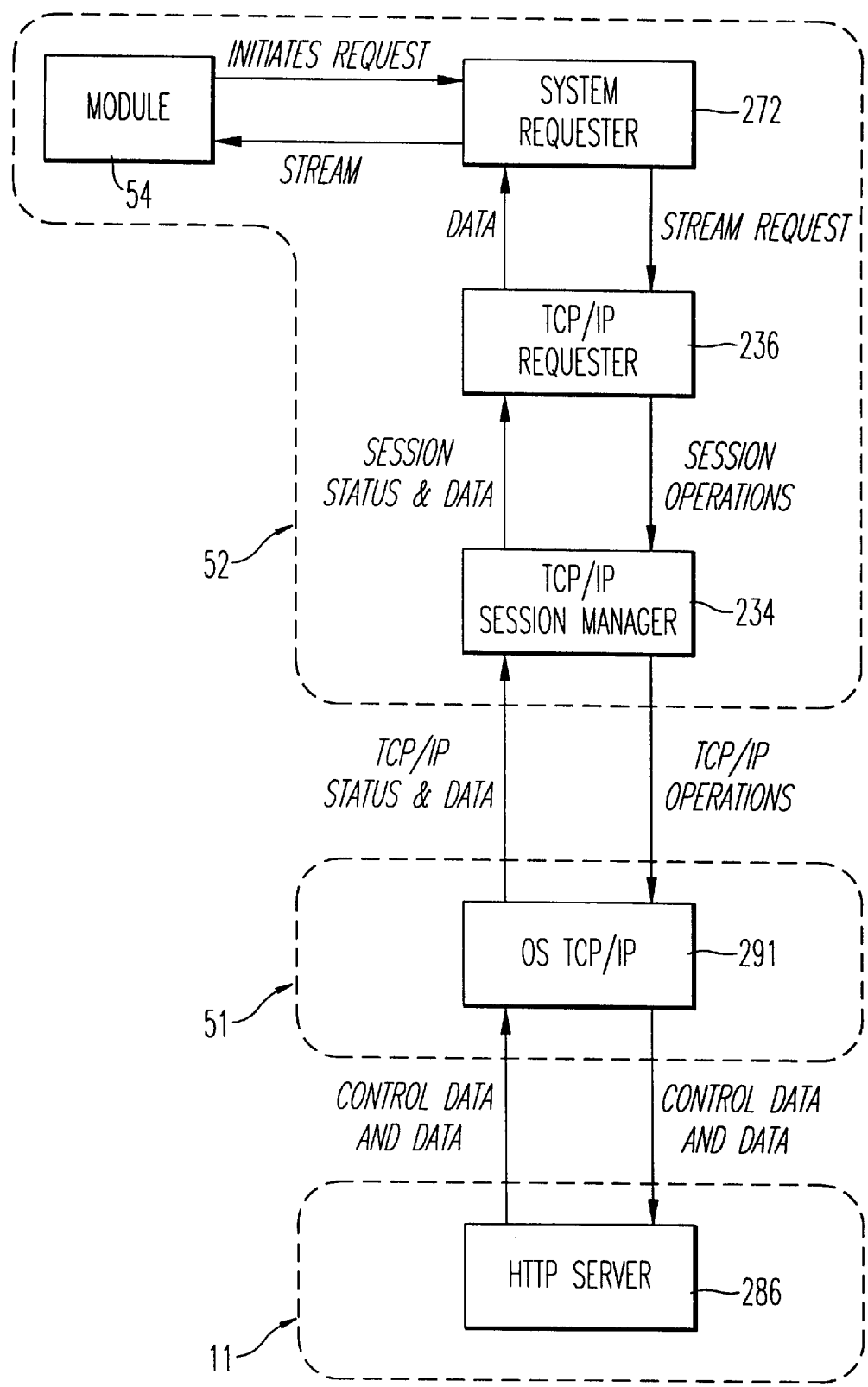
FIG. 20 is a schematic block diagram illustrating data flow between a customer computer and a remote dataset storage location accessed via a communication network in accordance with an embodiment of the present invention.
Figure 22:
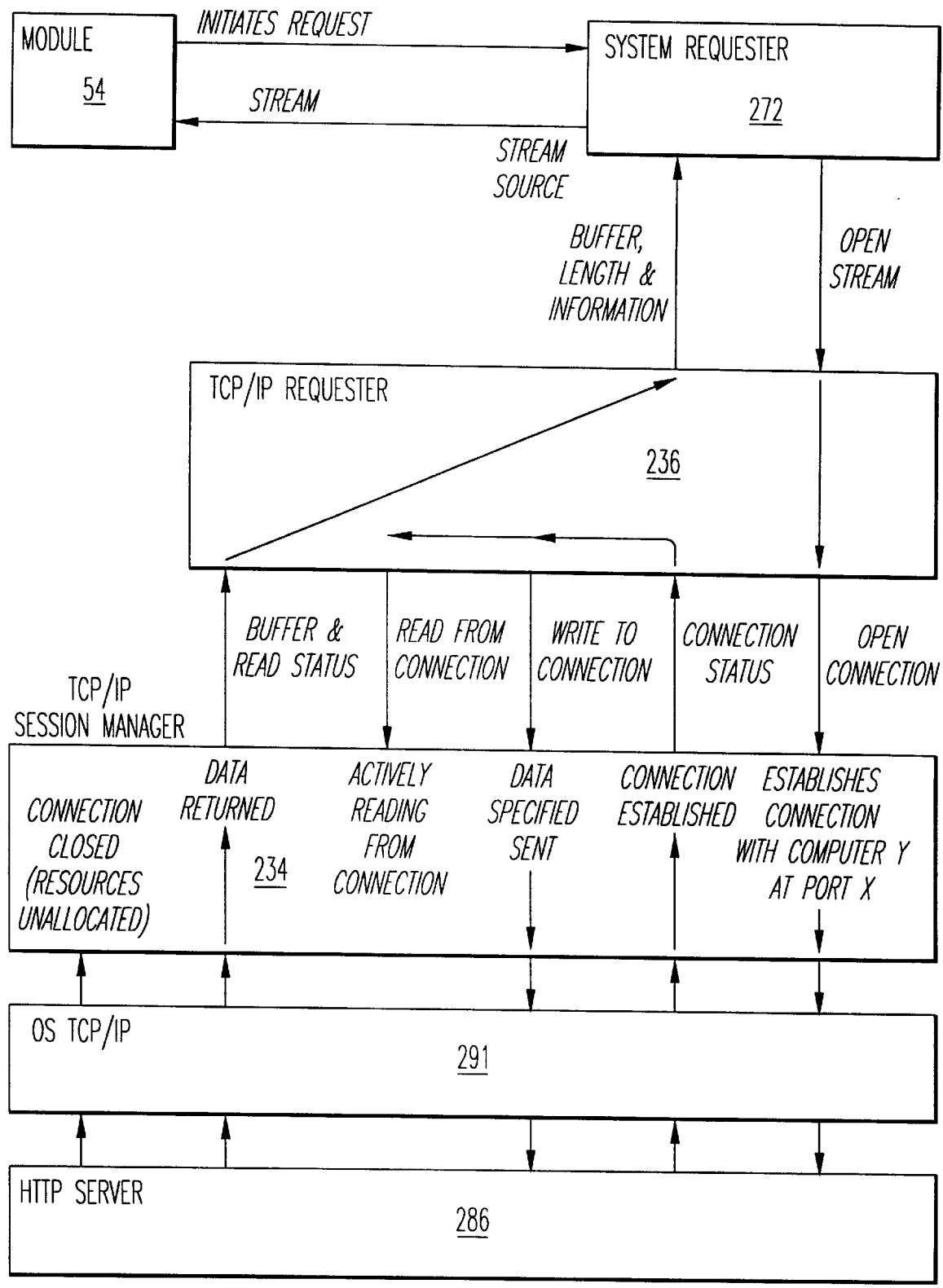
FIGS. 22, 23 and 24 are flow charts illustrating data flow between the components illustrated in FIG. 20.

FIG. 20 illustrates the flow of data between the kernel 52, the operating system 51 of the customer computer 12 and an information provider's site having, for example, a HyperText Transfer Protocol or HTTP server 286. In the illustrated example, a module 54 initiates a request for a selected dataset comprising a blue square. This results in a function called to a kernel service library which creates a user interface object for the customer display device 13. The system requester 272 determines whether or not the requested dataset is located on the hard drive cache 15 of the customer computer 12.

The system requester 272 maintains a location database table 288, a portion of which is shown in FIG. 21. The location database table 288 identifies each dataset by name 28 (e.g., sample image, purchasable item), a unique identification number 283 (i.e., a 64 bit code) and the type of data 285. The data type can be a root item which is essentially equivalent to a disc, a group item which is essentially equivalent to a directory on the disc, and an item or file within the root or one or more groups. The attributes 287 of the data can be, for example, secured, encrypted, locked, read-only, unavailable, size of the data, date created, date last modified, type, the name of the creator, among others. A field 289 within the location database also provides for variable data to be entered for each dataset, such as whether or not the dataset is a root identifier, is image data, or an executable file.

Using the location database table 288, the system requester 272 determines where the dataset is located, such as on a CD-ROM 18 or on one of a number of web servers 30. If an item is stored in more than one location, the system requester 272 can determine from which location the dataset can be downloaded to the hard drive 15 in the least amount of time. In the following example, a blue box dataset is located on a server 286. A stream request, therefore, is sent by the system requester 272 to the TCP/IP requester 236. The stream request can be a request to open a stream, close a stream, to list a directory or to obtain file information. The TCP/IP requester 236, in turn, sends session operations data to the TCP/IP session manager 234 which comprises a connection request to the Internet. The session manager 234 preferably maintains communication with the operating system 51 while the stream request is processed. The operating system 51 in turn maintains a connection with the fulfillment site, that is, the HTTP server 286 at an information provider's 11 facility, via a conventional OS TCP/IP software module 291 and an external data interface on the customer computer 12.

With continued reference to FIG. 20, the requested data stream is sent from the HTTP server 286 to the customer computer 12, along with control data required for its transmission, via the operating system 51 and the external data interface. While the session manager 234 maintains communication with the operating system 51, a user interface object is posted by the kernel 52 to the kernel event queue 58 which has been translated from an operating system event. The data stream is managed by the session manager 234 and the TCP/IP requester 236 and is passed to the system requester 272. Communication between the system requester 272 and the session manager is preferably accomplished using DDS events, kernel function calls and shared buffers at the customer computer 12. The user interface object obtains the stream file from a shared buffer and verifies that it is the requested data.

An event is then posted in the module event queue 60 corresponding to the source module 54. The module 54, in turn, retrieves the event from its module queue 60 and completes processing of the data stream.

Figure 23:
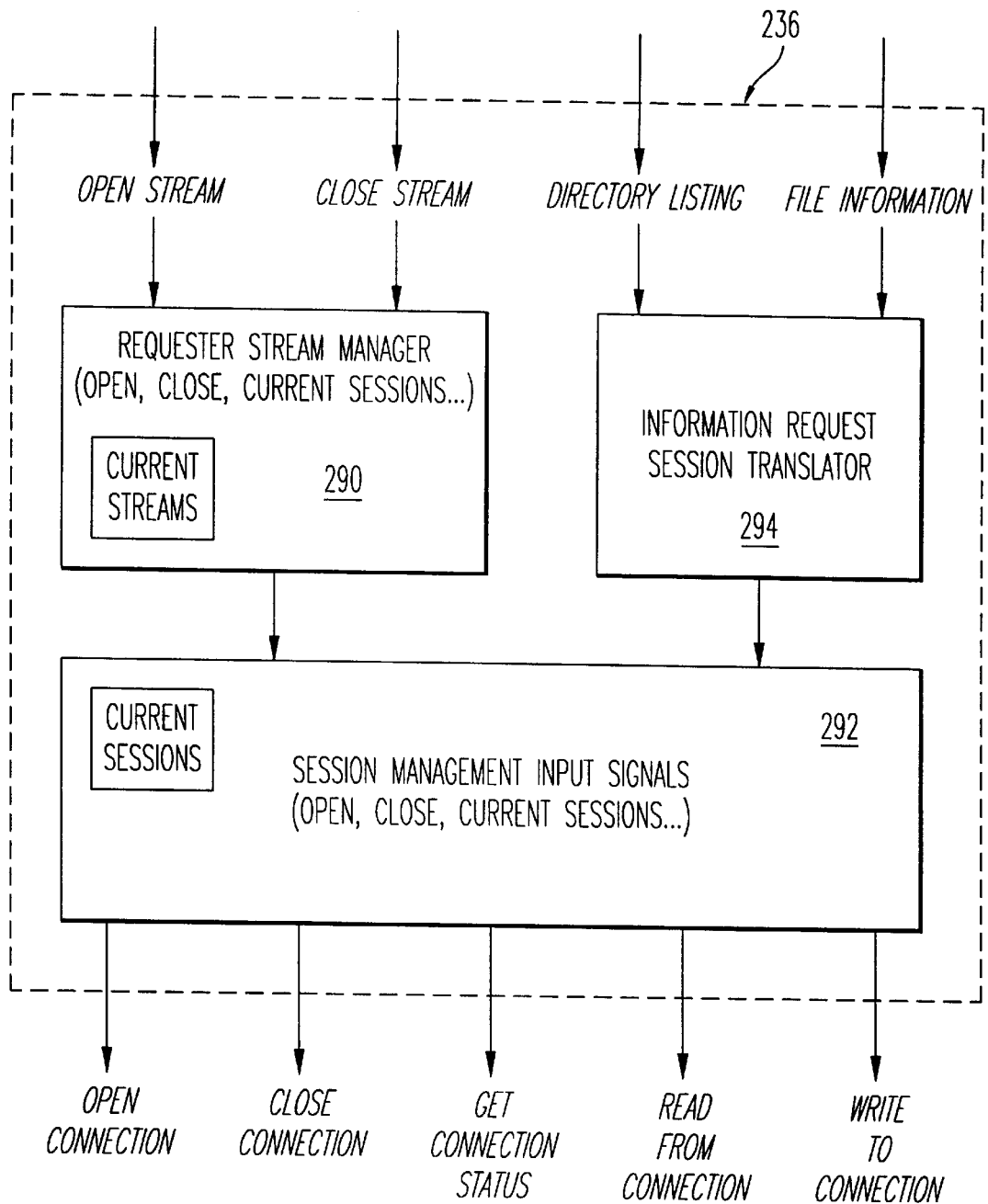

The communication between the requester modules will be described in more detail with reference to FIGS. 22–25. The system requester 272 transports an open stream to the TCP/IP requester 236. The TCP/IP requester 236 requests an open communication from the session manager 234 to establish a connection with an information source computer at a particular port (e.g., server 286). The connection is then completed through the operating system TCP/IP interface 291 to the HTTP server 286. As shown in FIG. 23, the system requester 272 can send an open stream input signal, a closed stream input signal, as well as directory listing and file information signals to the TCP/IP requester 236. The TCP/IP requester 236 uses a requester stream manager 290 to translate the open and closed stream input signals into session management input signals 292 for the session manager 234, such as open connection, close connection, get connection status, read from connection and write to connection. The directory listing and file information can also be interpreted and translated by an information request sessions translator 294 into an input signal for the session manager 234, apart from the open and close stream input signals.

Figure 24:
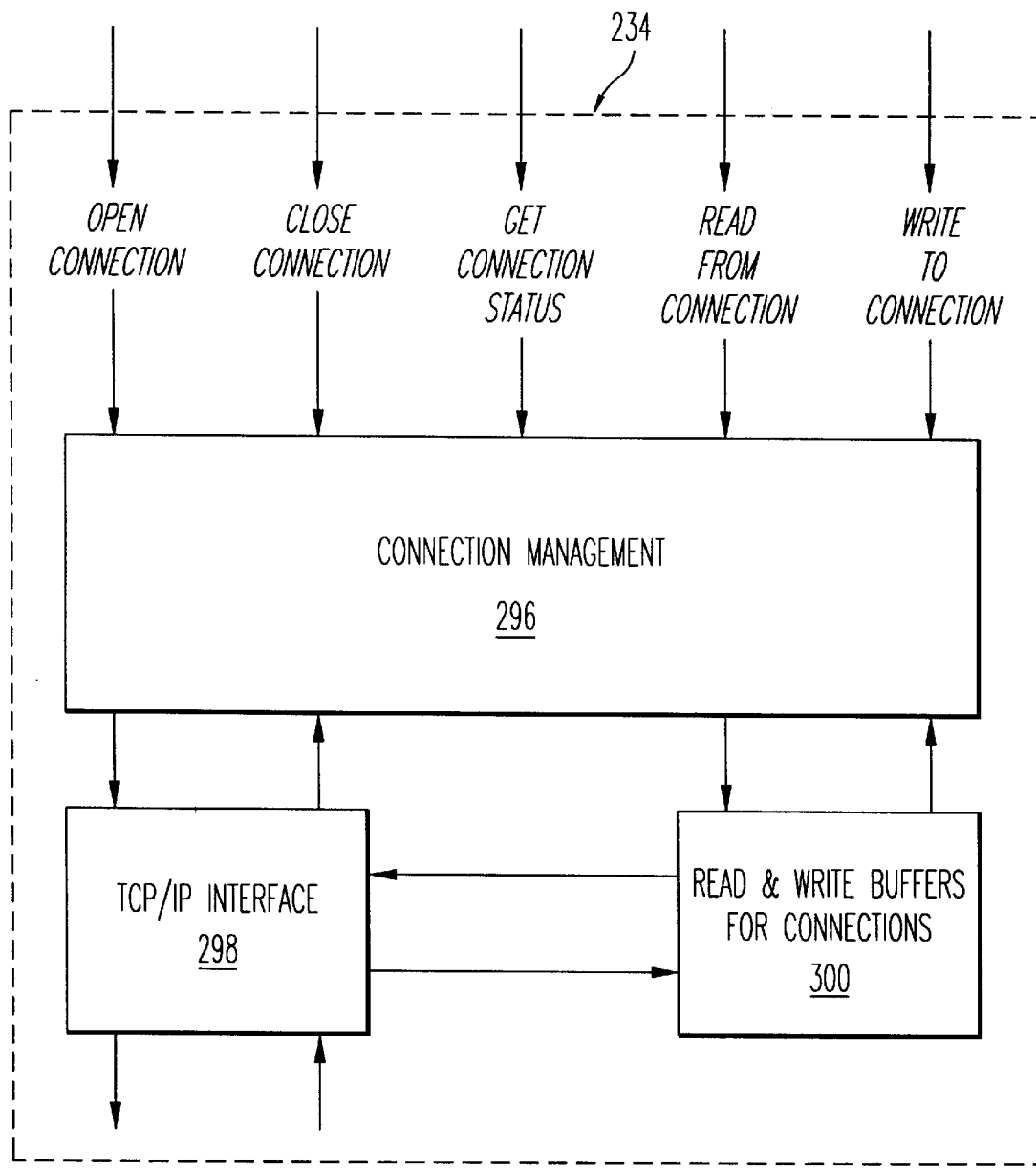
Figure 25:
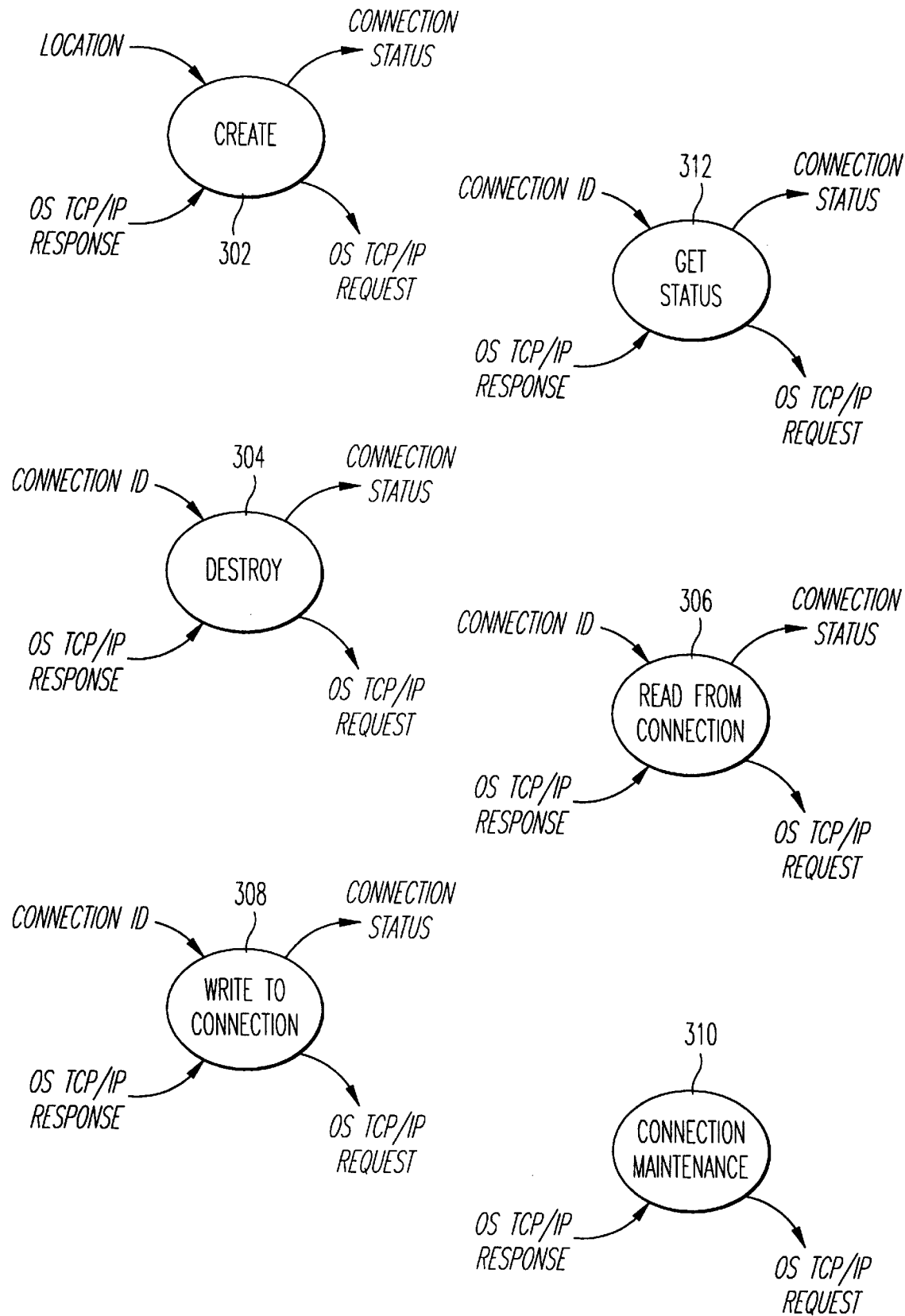
FIG. 25 illustrates high-level events processed by a TCP/IP session manager programmed in accordance with an embodiment of the present invention.

With reference to FIG. 24, the session manager 234 processes the input signals using a connection manager 296 and operates an interface 298 with the Internet, as well as read and write buffers 300 for connections thereto. The high level functions of the TCP/IP session manager are shown in FIG. 25. The Create process 302 creates and initializes required data structures and buffers, validates the dataset location and attempts to create a connection with the host computer 286 specified by that location. The Destroy process 304 closes a specific open connection and any associated buffers. The Read From Connection process 306 prepares buffers and a connection to allow incoming data on that specific connection to be captured for use. The Write To Connection process 308 writes specific data to a specific connection. The Connection Maintenance process 310 monitors the status of connections, attempts to recover lost or error-prone connections and notifies related processes about errors and changes in status. The Get Status process 312 generates data streams reporting connection sites. The information request session translator 294 manages a specialized connection through the session manager 234 to acquire file information or a directory listing. The returned information is then formatted into a data structure and returned to the system requester 272 as a stream.

The DDS requester technology is advantageous because it isolates the DDS 10 from the location of the data. A dataset could reside on a CD-ROM 18, on a corporate Internet 32, on a relational database server 28 or a web server 30 and can be accessed without requiring changes to the DDS modules 54. Datasets can be downloaded, as well as data for product updates and additional function calls, without substantial rewriting of code for existing DDS modules 54.

Figure 26:
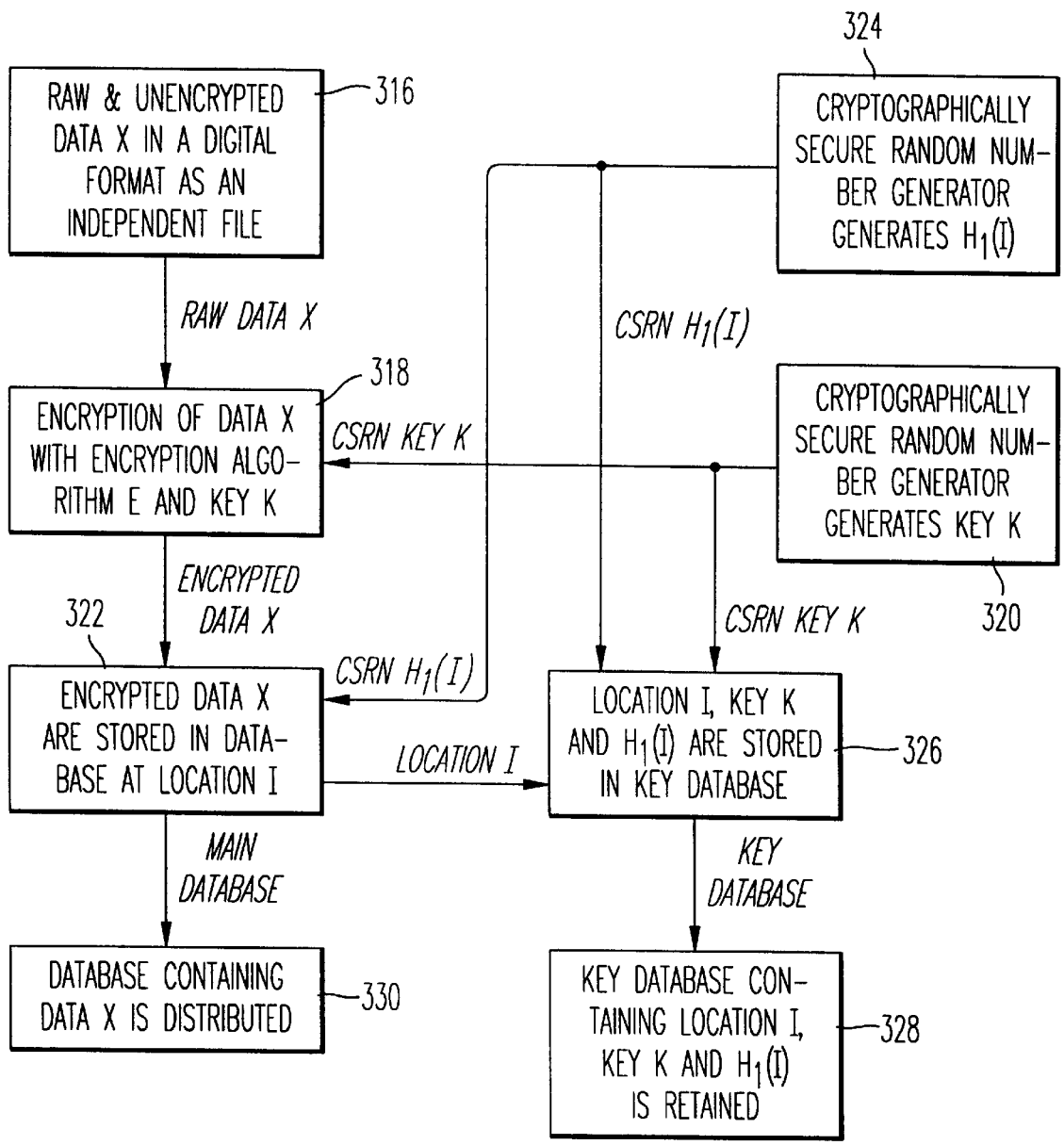
FIGS. 26, 27, 28 and 29 are flow charts illustrating the sequence of operations for generating release code requests and release codes in accordance with an embodiment of the present invention.

As stated previously, the DDS can 10 use a computer-dependent release code to release encrypted data to a customer. The process of generating release codes will be described with reference to FIGS. 26–29. Raw and unencrypted data in a digital format is stored in independent data files at, for example, an information provider data processing facility, as shown in block 316 in FIG. 26. The data is encrypted using a selected encryption algorithm (block 318). The key for encrypting and decrypting the data is preferably generated cryptographically using a random number generator (block 320). The encrypted data is then stored in a database at a particular location (block 322). The encrypted data can be stored, for example, as a dataset on a CD-ROM 18 accessed at an HTTP server 30 or at a customer computer. A unique dataset code is assigned to the dataset and is preferably generated using a hash algorithm on the location of the dataset (block 324). The location of the dataset, the key and the hashed dataset code are then stored in a key management database maintained at the fulfillment center 14 (blocks 326 and 328), and the encrypted data is distributed (block 330) on the CD-ROM 18, for example, or made available on the network 22.

Figure 27:
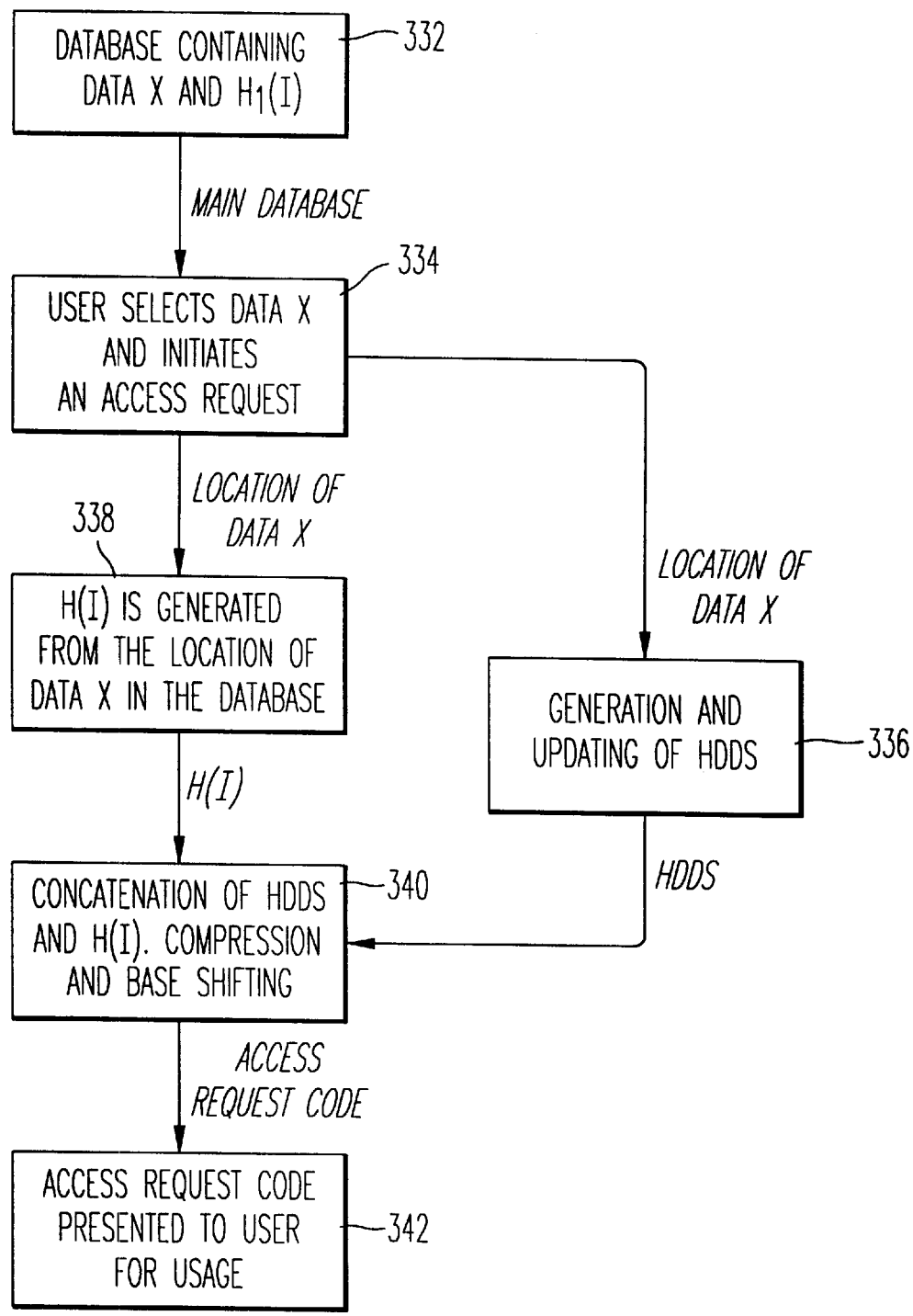

As shown in FIG. 27, a user can select a dataset and initiate a request by clicking on an item in a preview screen, for example (blocks 332 and 334). A hardware-dependent digital signature (HDDS) is generated in response to the dataset request (block 336). The signature can be based on a card number of a board within the customer computer or other computer-specific device. The location of the selected dataset is determined by the computer using a table on the CD-ROM 18 or available via the network 22 and preferably hashed (block 338). The hashed location is then concatenated with the HDDS and compressed to present the user with a product code corresponding to the selected dataset (blocks 340 and 342).

Figure 28:
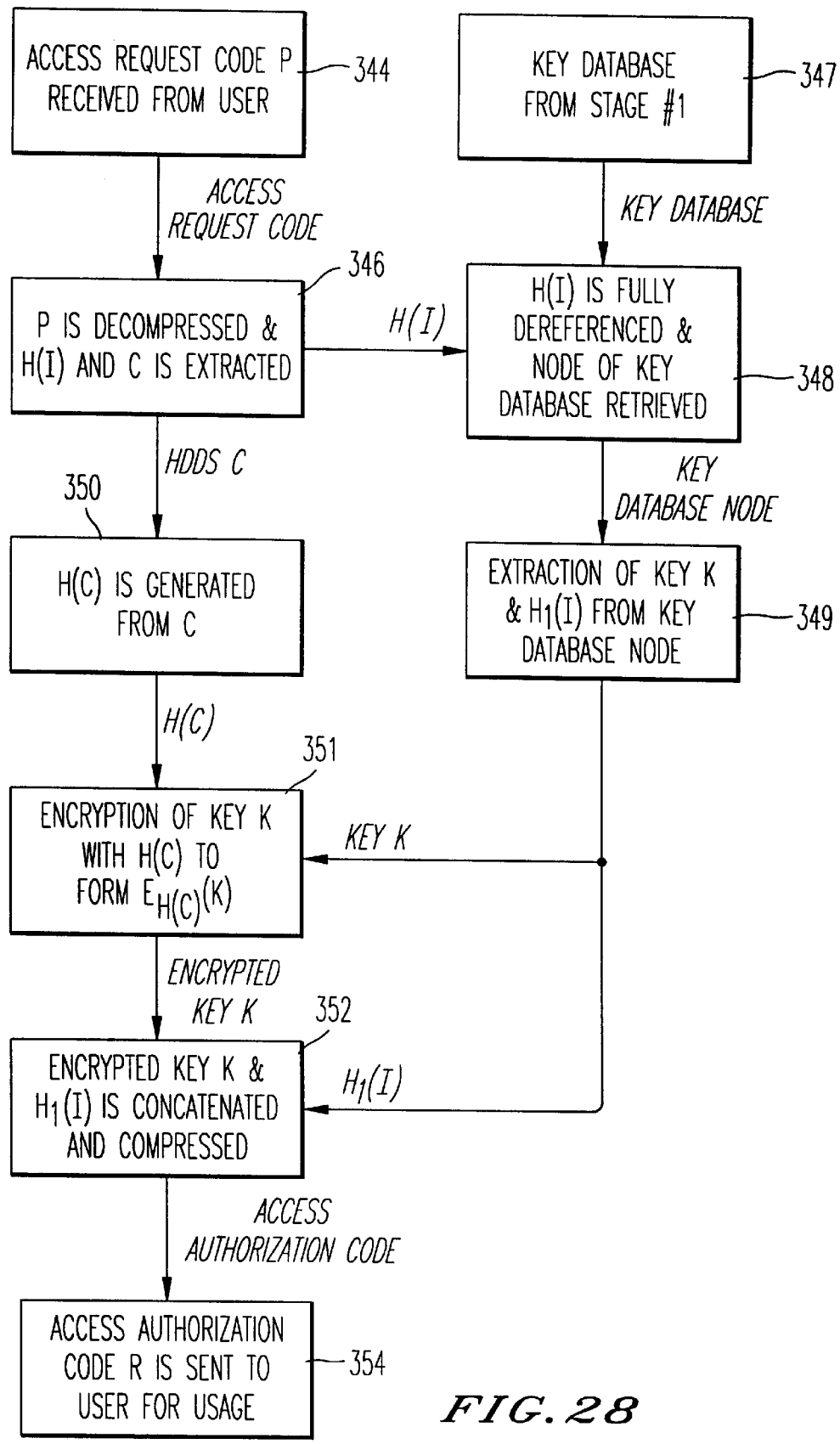

As shown in FIG. 28, the product code is forwarded to the fulfillment center 14 (block 344), where it is processed to decompress the product code, and to extract the hashed location of the selected dataset and the HDDS (block 346). The hashed location is used to find the key within the key management database for decrypting the requested dataset (blocks 347, 348 and 349). The HDDS is then hashed (block 350) and encrypted along with the key (block 351). The encrypted key is concatenated with the hashed dataset code (block 252), compressed, and sent as a release code to the customer (block 354).

Figure 29:
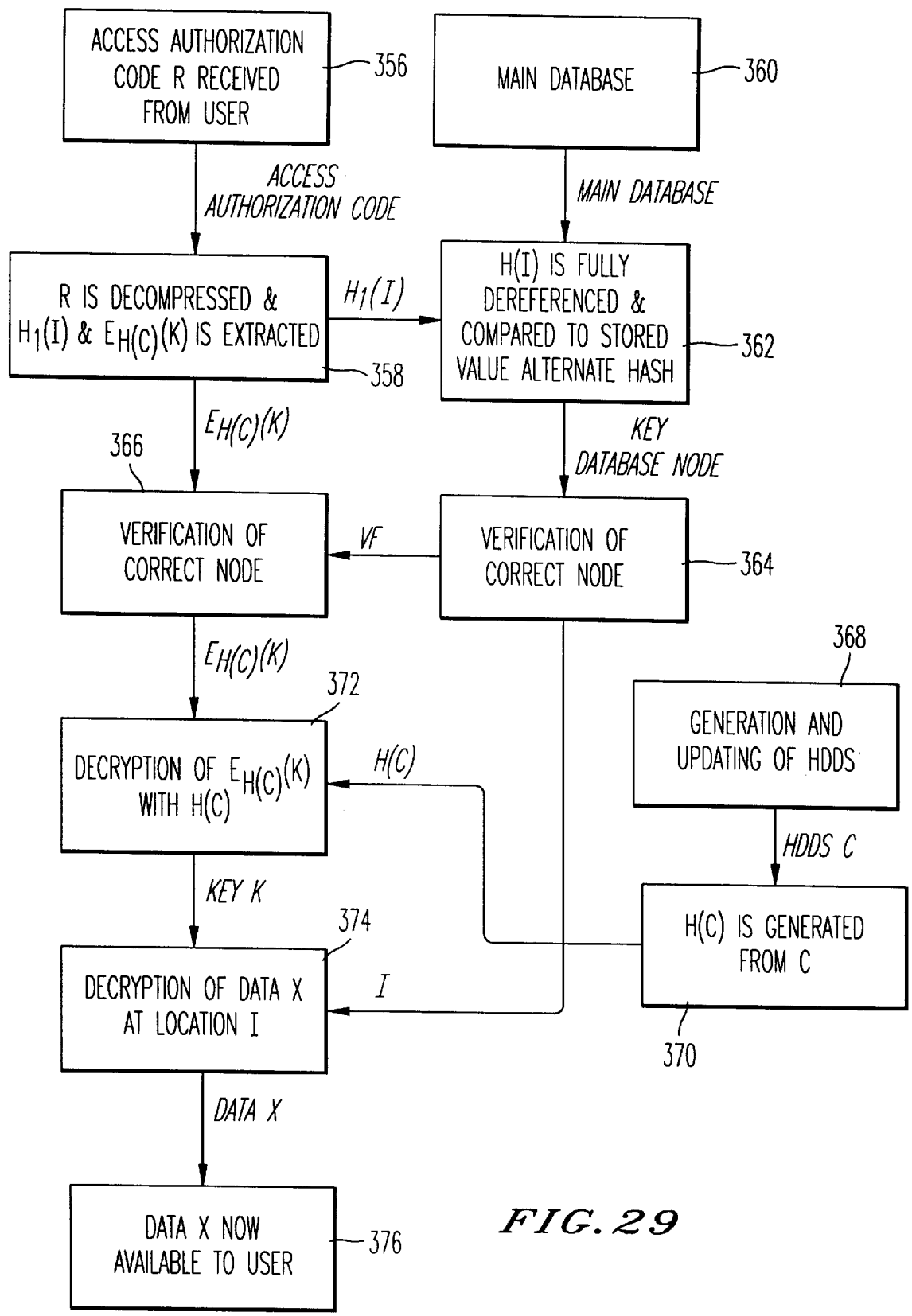

With reference to FIG. 29, the customer enters the release code into an authorization screen generated on the customer computer (block 356). The release code is then decompressed (block 358). The hashed dataset code based on the dataset location, and the encrypted key using the hashed HDDS, are extracted from the release code. The hashed dataset code is processed to ensure that the key is being provided to an authorized customer computer (block 360, 362, 364 and 366). For example, the location of the selected dataset can be hashed and then compared with the hashed dataset code. The rehashing of the dataset code is preferably performed independently of the encrypted hashed HDDS and key combination. The digital signature HDDS is regenerated (blocks 368 and 370) to decrypt the key (blocks 372 and 374). The HDDS is regenerated independently of the release code to further protect against use of the release code on an unauthorized computer. The decrypted key is then used to unlock the selected dataset to the user (block 376).

The generation of the product and release codes in the key management system are advantageous when granting authorization to customers to access datasets because the product code and release codes are linked to the source computer. The transmission of both of the product codes and release codes described herein between the customer computer 12 from which the dataset was requested and the information provider 11 computer or fulfillment center 14 granting authorization ensures that the release code successfully decrypts the dataset on only an authorized computer. In accordance with the present invention, an unauthorized computer may be able to obtain a release code; however, the dataset is not likely to be successfully decrypted into meaningful information. This is because the key for decryption must also be decrypted using a hardware signature of the requesting computer 12 which is derived independently of the release code.

While certain embodiments have been chosen to illustrate the invention, it will be understood by those skilled in the art that various changes and modifications can be made herein without departing from the scope of the invention as specified in the claims.

What is claimed is:

1. A modular kernel for managing events and function calls processed at a customer computer in a system for distributing digital data among a plurality of customers, the data being provided to the system by at least one information provider and stored in a plurality of datasets, the system having a transaction processing device for maintaining a database comprising the storage locations of the datasets and the cost of accessing the datasets, the kernel being used in conjunction with a host operating system on the customer computer, the kernel comprising:

a kernel operating system interface module for managing communication between said kernel and said operating system by translating operating system events generated by said operating system into at least one of said events;

a plurality of kernel modules selected from the group consisting of a module for accessing said data at a local one of said storage locations, a module for accessing said data at a remote one of said storage locations, a module for data encryption and decryption, a module for data compression and decompression, a credit card payment module, a telephone transaction module, a communication network transaction module, a module for searching said data, a module for previewing at least part of said data, an external device plug-in module, a JAVA Applet module, an image file module, a video hypermedia file module, a image hypermedia file module, a start-up module, a deinitialization module and a bootstrap module, said kernel modules each being programmed to post said events with at least one of said operating system and another one of said kernel modules and to maintain a module queue for storing said events;

a kernel event queue, said kernel operating system interface and each of said plurality of kernel modules being programmed to post said events in said kernel event queue; and a dispatcher module for retrieving each of said events from said kernel event queue and routing said events to one of said module queues.

2. A kernel as claimed in claim 1, wherein said kernel is maintained in a storage device that is independent of said computer, said kernel being programmed to initialize with only a subset of said plurality of said kernel modules, and said dispatcher being programmed to dynamically load and unload selected ones of said plurality of kernel modules between said computer and said storage device when desired, depending on which of said events said dispatcher retrieves from said kernel event queue.

3. A kernel as claimed in claim 1, wherein said storage locations are selected from the group consisting of a communication network, a database server, a web site server and a portable storage device, and further comprising at least one requester module programmed to automatically access and transmit said data to said customer computer while maintaining said storage location transparent to said plurality of kernel modules, said plurality of kernel modules being programmed to operate independently of different said storage locations.

4. A kernel as claimed in claim 1, further comprising at least one requester module for establishing, monitoring and terminating connections between said kernel and a digital communications network.

5. A kernel as claimed in claim 4, wherein said operating system is comprises a communications network stack for connecting to said network and said requester module is programmed operate in conjunction with said stack and post said events to said host operating system to receive said data from said network.

6. A kernel as claimed in claim 1, further comprising a plurality of specific requester modules for accessing and retrieving said data from respective storage locations selected from the group consisting of a database server, a communication network, a web site and a portable storage device, and a system requester module for invoking one of said specific requester modules depending on the location of said data and transmitting said data to said customer computer, said system requester module and said plurality of specific requester modules being programmable to maintain said storage locations transparent with respect to said plurality of kernel modules.

7. A kernel as claimed in claim 1, wherein said customer computer comprises a local memory device, said system requester module being programmable to determine whether said data is located on one of said portable storage device and said local memory device before invoking one of said specific requester modules corresponding to said database server, said communication network and said web site.

8. A kernel as claimed in claim 1, wherein said customer computer has a user interface device, said kernel comprises at least one service routine for handling said user interface device and said plurality of kernel modules are each programmed to generate said function calls to said service routine to communicate with said user interface device.

9. A kernel as claimed in claim 1, further comprising different sets of said plurality of kernel modules, each of said sets being programmed in accordance with the respective application programming interface functions of different operating systems corresponding in number to said sets.

10. A kernel as claimed in claim 8, wherein said operating systems are selected from the group consisting of UNIX, WINDOWS NT, WINDOWS 95, WINDOWS 3.x and WINOS2 for the 80x86 architecture, WINOS2 for the PowerPC architecture, MacOS2 for the PowerPC architecture, and Mac for the 680x0 architecture.

11. A method of fulfilling a customer request for a dataset selected from a plurality of datasets comprising the steps of:

receiving a request via a user interface device at a customer computer having an operating system;

posting an operating system event into an operating system event queue;

retrieving said operating system event from said operating system event queue;

translating said operating system event into a kernel event for processing by a kernel;

determining which of a plurality of kernel modules is the destination module for said kernel event, each of said plurality of kernel modules having a corresponding module event queue, said plurality of kernel modules selected from the group consisting of a module for searching for said dataset among said plurality of datasets, a module for previewing at least part of said dataset, a telephone transaction module for ordering said dataset, a communications network transaction module for transmitting said dataset to said customer from a network, a module for accessing said dataset at a local storage location, a module for accessing said dataset at a remote storage location, a module for performing data encryption and decryption on said dataset, a module for performing data compression and decompression on said dataset, a credit card payment module for purchasing said dataset, an external device plug-in module, an image file module, a video hypermedia file, module, an image hypermedia module, a start-up module for initializing each of said kernel modules, a deinitialization module for terminating operation of said kernel modules, and a bootstrap module; and dispatching said kernel event to said module event queue corresponding to said destination module.

12. A method as claimed in claim 11, wherein said destination module is programmed to establish a connection to a remote transaction processing system, said method further comprising the steps of:

locating said selected dataset;

completing a payment transaction with said customer computer via said transaction processing system to purchase said selected dataset.

13. A method as claimed in claim 12, wherein said customer computer comprises a local memory device and said plurality of kernel modules comprises a specific requester modules for accessing and retrieving said dataset from respective ones of a plurality of storage locations selected from the group consisting of a database server, a communication network, a web site and a portable storage device transparently with respect to other ones of said plurality of kernels and a system requester module for invoking one of said specific modules depending on where said selected dataset is located, said locating step comprising the step of determining whether said selected dataset is located in one of said local memory device and said portable storage device using said system requester module before invoking one of said specific requester modules corresponding to said database server, said communication network, and said web site.

14. A method as claimed in claim 12, wherein said connection is selected from the group consisting of a telephone conference between said customer and an operator at said transaction processing system, a facsimile transmission from said customer computer to said transaction processing system, transmission of dual tone multifrequency signals generated at said customer computer to said transaction processing system, and a communication network link between said customer computer and said transaction processing system.

15. A method as claimed in claim 12, further comprising the step of determining the level of authorization required to access said selected dataset using said transaction processing system.

16. A method as claimed in claim 11, further comprising the steps of monitoring said operating system event queue and retrieving a kernel event from said kernel event queue when no said operating system events have been posted in said operating system queue.

17. A method as claimed in claim 11, further comprising the steps of:

processing said event using said destination module;

generating a new event if event processing by one of said plurality of kernel modules is required; and generating a function call to said kernel to execute a service routine if a selected function of said kernel is desired.

18. A method as claimed in claim 17, wherein said service routine is selected from the group consisting of generating window displays on a monitor connected to said customer computer, generating menus for display on said monitor, and managing said kernel modules.

19. A method of fulfilling a customer request for a dataset selected from a plurality of datasets comprising the steps of:

initializing a kernel stored on one of a portable data storage device and a remote data storage device accessed via a communication network to store and operate said kernel from a local memory device connected to a customer computer, said kernel comprising a plurality of kernel modules and being programmed to initialize with a subset of said kernel modules;

entering said request at said customer computer via a user interface device connected thereto;

determining where said selected dataset is located, the location of said dataset being selected from the group consisting of said local memory device, said portable data storage device, and said remote data storage device;

loading at least one of said plurality of kernel modules on said local memory device depending on said location of said dataset;

executing said kernel module to perform at least one of a plurality of functions comprising downloading said dataset to said local memory device if said selected dataset is currently on said portable data storage device, initiating a connection to said communications network if said dataset is not on said local memory device and is not on said portable data storage device, monitoring said connection, and terminating said connection after said dataset is transmitted to said customer computer.

20. A method as claimed in claim 19, wherein said determining step comprises the steps of:

determining whether said customer is authorized to access said dataset; and generating a message on a user interface of said customer computer indicating when access is denied.

21. A method as claimed in claim 19, further comprising the steps of loading a transaction module on local memory device for establishing a connection to a remote processing device, and conducting a payment transaction with said customer computer to allow said customer to purchase said dataset via said remote processing device.

22. A method as claimed in claim 21, wherein said dataset is available on-line via said communication network and not downloaded, and further comprising the step of determining a price for purchasing said dataset for a predetermined period of time via said remote processing device.

23. A system for distributing data among a plurality of customers, the data being provided to the system as datasets by at least one information provider, comprising:

at least one customer computer having a memory device, a display device, a user interface device and a first processing device;

a fulfillment center adapted for communication with said customer via at least one of a telephone and a communication network interface for transmitting digital data, said fulfillment center comprising a second processing device; and a plurality of data storage devices comprising a portable storage device and a shared memory device accessible via a communication network, said datasets from said information provider being stored on said at least one of said plurality of data storage devices, said first processing device being programmable to generate a request for a selected one of said datasets comprising a product code corresponding to said selected dataset and to transmit said request to said second processing device via said telephone line if said at least one data storage device is a portable storage device installed at said customer computer and otherwise via said communication network, said second processing device being programmable to process said request to determine if said customer has authorization to access said selected dataset, to generate a release code and to transmit said release code to said customer computer via said telephone line if said selected dataset is stored on said portable storage device installed at said customer computer and otherwise via said communication network, said first processing device being programmable to receive said release code and to download said selected dataset from said plurality of storage devices to said memory device.

24. A system as claimed in claim 23, wherein said first processing device is programmed to display a brief description of a number of said datasets on said display device to allow said customer to preview said corresponding datasets before generating said request.

25. A system as claimed in claim 23, further comprising a system requester software module and a network communications module, said first processing device being operable in accordance with said system requester software module to determine on which of said portable storage device and said shared memory device said selected dataset is stored and to selectively initiate said network communications module when said selected dataset is stored on said shared memory device, said network communications software module being operable to establish and terminate connections between said customer computer and said communications network.

26. A method of distributing data among a plurality of customers computers, the data being provided to the system as datasets by at least one information provider, the method comprising the steps of:

storing said datasets in at least one of a plurality of data storage devices comprising local portable storage device for use with said customer computers and a shared memory device accessible via a communication network;

providing at least one of said customer computers with a kernel;

generating a request signal in response to said customer selecting one of said datasets using a user interface device connected to said customer computer;

determining the location of said selected dataset in said plurality of data storage devices;

transmitting said request to a remote processing center via a communications network link if said selected dataset is not stored in said portable storage device;

establishing a telephone connection to said remote processing center if said selected dataset is stored in said portable storage device;

completing a payment transaction with said computer via one of said telephone connection and said communications network link to purchase said selected dataset; and transmitting a release code to said customer computer for accessing said selected dataset.

27. A method of authorizing customer access to secured datasets comprising the steps of:

collecting raw data from at least one information provider;

encrypting said raw data using an algorithm and a cryptographically generated key;

storing said raw data as individual datasets having respective locations in a key database;

storing said key in said key database;

encrypting each of said locations of said datasets; and storing said encrypted locations in said key database.

28. A method as claimed in claim 27, wherein said step for encrypting said location comprises the step of encrypting said signature using a Hash algorithm.

29. A method as claimed in claim 27, further comprising the steps of:

selecting one of said datasets using a computer;

generating a signature corresponding to said computer;

determining said location of said selected dataset using said computer and encrypting said location;

combining said encrypted location of said selected dataset and said signature into a product code corresponding to said selected dataset.

30. A method as claimed in claim 29, wherein said step for generating said signature comprises the step of deriving said signature from a hardware component in said computer.

31. A method as claimed in claim 29, further comprising the steps of:

transmitting said product code to a processing device programmable to access said key database;

generating a release code using said key corresponding to said selected dataset; and transmitting said release code to said computer to decrypt said selected dataset.

32. A method as claimed in claim 31, wherein said remote processing device being programmable to perform financial transactions and to determine the price of said selected dataset and further comprising the step of establishing credit for a user at said computer before transmitting said release code.

33. A method as claimed in claim 29, further comprising the steps of:

extracting said signature and said encrypted location for said selected dataset from said product code using a processing device that is programmable to access said key database;

locating said selected dataset in said key database using said extracted encrypted location of said selected dataset;

extracting said key corresponding to said selected dataset from said key database;

encrypting said signature;

encrypting said key corresponding to said selected dataset using said encrypted signature; and generating a release code by combining said encrypted key with said encrypted location corresponding to said selected dataset and stored in said key database.

34. A method as claimed in claim 33, further comprising the steps of:

processing said release code using said computer to extract said encrypted key, and said encrypted location corresponding to said selected dataset and stored in said key database, therefrom;

verifying said computer using said encrypted location corresponding to said selected dataset and stored in said key database and said encrypted location of said selected dataset generated during said determining step;

generating a second signature corresponding to said computer;

encrypting said second signature;

decrypting said encrypted key using said encrypted second signature; and decrypting said selected dataset using said decrypted key.

* * * * *